(12) United States Patent
Sinclair

(10) Patent No.: US 8,239,639 B2
(45) Date of Patent: Aug. 7, 2012

(54) METHOD AND APPARATUS FOR PROVIDING DATA TYPE AND HOST FILE INFORMATION TO A MASS STORAGE SYSTEM

(75) Inventor: Alan W. Sinclair, Falkirk (GB)

(73) Assignee: SanDisk Technologies Inc., Plano, TX (US)

( * ) Notice: Subject to any disclaimer, the term of this patent is extended or adjusted under 35 U.S.C. 154(b) by 998 days.

(21) Appl. No.: 12/030,018

(22) Filed: Feb. 12, 2008

(65) Prior Publication Data

US 2008/0307158 A1    Dec. 11, 2008

Related U.S. Application Data

(63) Continuation-in-part of application No. 11/760,480, filed on Jun. 8, 2007, now abandoned.

(51) Int. Cl.
*G06F 12/00* (2006.01)

(52) U.S. Cl. .......................... 711/154; 707/824

(58) Field of Classification Search ............... 711/103, 711/156, 154, 170, 173, 111; 707/824
See application file for complete search history.

(56) References Cited

U.S. PATENT DOCUMENTS

| | | | |
|---|---|---|---|
| 5,570,315 A | 10/1996 | Tanaka et al. | |
| 5,774,397 A | 6/1998 | Endoh et al. | |
| 5,845,313 A | 12/1998 | Estakhri et al. | |
| 6,046,935 A | 4/2000 | Takeuchi et al. | |
| 6,125,435 A | 9/2000 | Estakhri et al. | |
| 6,128,695 A | 10/2000 | Estakhri et al. | |
| 6,202,138 B1 | 3/2001 | Estakhri et al. | |
| 6,373,746 B1 | 4/2002 | Takeuchi et al. | |
| 6,456,528 B1 | 9/2002 | Chen | |
| 6,522,580 B2 | 2/2003 | Chen et al. | |
| 6,732,222 B1 | 5/2004 | Garritsen et al. | |
| 6,763,424 B2 | 7/2004 | Conley | |
| 6,771,536 B2 | 8/2004 | Li et al. | |
| 6,781,877 B2 | 8/2004 | Cernea et al. | |
| 6,928,426 B2 * | 8/2005 | Dake | 707/781 |
| 7,139,864 B2 | 11/2006 | Bennett | |
| 7,475,185 B2 * | 1/2009 | Nakanishi et al. | 711/103 |
| 2002/0013871 A1 * | 1/2002 | Kakiage | 710/65 |
| 2003/0014278 A1 | 1/2003 | Park et al. | |
| 2003/0109093 A1 | 6/2003 | Harari et al. | |
| 2005/0055497 A1 | 3/2005 | Estakhri et al. | |
| 2005/0141312 A1 | 6/2005 | Sinclair et al. | |
| 2005/0141313 A1 | 6/2005 | Gorobets | |

(Continued)

OTHER PUBLICATIONS

U.S. Appl. No. 11/760,469, filed Jun. 8, 2007, entitled "Method of Interfacing a Host Operating Through a Logical Address Space With a Direct File Storage Medium".

(Continued)

*Primary Examiner* — Jared Rutz
(74) *Attorney, Agent, or Firm* — Brinks Hofer Gilson & Lione

(57) ABSTRACT

A method and system for providing advance data type information to a mass storage system is disclosed. The method may include a host system providing host file information, such as a host file identifier and/or a data type, to a memory system in addition to LBA format data. The system may include a processor, a memory system interface and a host file system operative on the processor to identify and provide host file information and/or data type information to the memory system along with LBA format data.

16 Claims, 13 Drawing Sheets

U.S. PATENT DOCUMENTS

| | | |
|---|---|---|
| 2005/0144357 A1 | 6/2005 | Sinclair |
| 2005/0144358 A1 | 6/2005 | Conley |
| 2005/0144360 A1 | 6/2005 | Bennett et al. |
| 2005/0144363 A1 | 6/2005 | Sinclair |
| 2005/0144365 A1 | 6/2005 | Gorobets |
| 2005/0144367 A1 | 6/2005 | Sinclair |
| 2005/0166087 A1 | 7/2005 | Gorobets |
| 2005/0182890 A1 | 8/2005 | Yamagami |
| 2005/0198425 A1* | 9/2005 | Wang ............................ 710/305 |
| 2006/0004787 A1 | 1/2006 | Borthakur et al. |
| 2006/0020744 A1 | 1/2006 | Sinclair |
| 2006/0020745 A1 | 1/2006 | Conley et al. |
| 2006/0155920 A1 | 7/2006 | Smith |
| 2006/0155921 A1 | 7/2006 | Gorobets |
| 2006/0155922 A1 | 7/2006 | Gorobets |
| 2006/0184718 A1 | 8/2006 | Sinclair et al. |
| 2006/0184719 A1 | 8/2006 | Sinclair |
| 2006/0184720 A1 | 8/2006 | Sinclair et al. |
| 2006/0184722 A1 | 8/2006 | Sinclair |
| 2006/0184723 A1 | 8/2006 | Sinclair et al. |
| 2007/0030734 A1 | 2/2007 | Sinclair et al. |
| 2007/0033323 A1 | 2/2007 | Gorobets |
| 2007/0033324 A1 | 2/2007 | Sinclair |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033328 A1 | 2/2007 | Sinclair et al. |
| 2007/0033329 A1 | 2/2007 | Sinclair et al. |
| 2007/0033330 A1 | 2/2007 | Sinclair et al. |
| 2007/0033331 A1 | 2/2007 | Sinclair et al. |
| 2007/0033332 A1 | 2/2007 | Sinclair et al. |
| 2007/0033373 A1 | 2/2007 | Sinclair |
| 2007/0033374 A1 | 2/2007 | Sinclair et al. |
| 2007/0033375 A1 | 2/2007 | Sinclair et al. |
| 2007/0033376 A1 | 2/2007 | Sinclair et al. |
| 2007/0033377 A1 | 2/2007 | Sinclair et al. |
| 2007/0033378 A1 | 2/2007 | Sinclair et al. |
| 2007/0033413 A1 | 2/2007 | Terrell et al. |
| 2007/0086260 A1 | 4/2007 | Sinclair |
| 2007/0088904 A1 | 4/2007 | Sinclair |
| 2007/0136553 A1 | 6/2007 | Sinclair |
| 2007/0136555 A1 | 6/2007 | Sinclair |
| 2007/0143532 A1 | 6/2007 | Gorobets |
| 2007/0143570 A1 | 6/2007 | Gorobets |
| 2007/0143571 A1 | 6/2007 | Sinclair |
| 2007/0186032 A1 | 8/2007 | Sinclair |
| 2008/0155175 A1 | 6/2008 | Sinclair et al. |
| 2008/0155227 A1 | 6/2008 | Sinclair et al. |

OTHER PUBLICATIONS

U.S. Appl. No. 11/616,242, filed Dec. 26, 2006, entitled "Use of a Direct Data File System With a Continuous Logical Address Space Interface".

U.S. Appl. No. 11/616,236, filed Dec. 26, 2006, entitled "System Using a Direct Data File System With a Continuous Logical Address Space Interface".

U.S. Appl. No. 11/616,231, filed Dec. 26, 2006, entitled "Configuration of Host LBA Interface With Flash Memory".

U.S. Appl. No. 11/616,228, filed Dec. 26, 2006, entitled "Host System With Direct Data File Interface Configurability".

Office Action issued in U.S. Appl. No. 11/760,469, dated Jul. 1, 2009 (31 pages).

Office Action issued in U.S. Appl. No. 11/760,469, dated Feb. 19, 2010 (32 pages).

Office Action issued in U.S. Appl. No. 11/760,469, dated Jul. 29, 2010 (69 pages).

Office Action issued in U.S. Appl. No. 11/760,469, dated Mar. 16, 2011 (23 pages).

Office Action issued in U.S. Appl. No. 11/760,480, dated Jul. 7, 2009 (39 pages).

Office Action issued in U.S. Appl. No. 11/760,480, dated Jan. 6, 2010 (42 pages).

Office Action issued in U.S. Appl. No. 11/760,469, on Oct. 5, 2011 (21 pages).

* cited by examiner

METHOD AND APPARATUS FOR PROVIDING DATA TYPE AND HOST FILE INFORMATION TO A MASS STORAGE SYSTEM

CROSS-REFERENCE TO RELATED APPLICATIONS

This application is a continuation-in-part of U.S. application Ser. No. 11/760,480, filed Jun. 8, 2007 now abandoned, the entirety of which is hereby incorporated by reference herein.

TECHNICAL FIELD

This application relates generally to data communication between memory systems, such as re-programmable non-volatile semiconductor flash memory, and a host device to which the memory is connected or connectable.

BACKGROUND

When writing data to a conventional flash data memory system, a host typically assigns unique logical addresses to sectors, clusters or other units of data within a continuous virtual address space of the memory system. The host writes data to, and reads data from, addresses within the logical address space of the memory system. The memory system then commonly maps data between the logical address space and the physical blocks or metablocks of the memory, where data is stored in fixed logical groups corresponding to ranges in the logical address space. Generally, each fixed logical group is stored in a separate physical block of the memory system. The memory system keeps track of how the logical address space is mapped into the physical memory but the host is unaware of this. The host keeps track of the addresses of its data files within the logical address space but the memory system operates without knowledge of this mapping.

A drawback of hosts that operate in a logical address space, also referred to as logical block address (LBA) format, is fragmentation and the challenge this poses to a memory system to efficiently store data. Data written by a host file system may often be fragmented in logical address space, where many fixed logical groups are only partially updated with new data. The fragmentation may occur as a result of cumulative fragmentation of free space by the host file system, and possibly even as a result of inherent fragmentation of individual files by the host file system. The fragmented logical groups will need to be rewritten in full in a different physical block. The process of rewriting the fragmented logical groups may involve copying unrelated data from the prior location of the logical group. This overhead can result in lower performance and reduced device lifetime for a flash memory system. The LBA format information sent by the host provides little or no opportunity for a memory system to adjust or optimize its storage routines to avoid this possible lower performance and reduced lifetime.

BRIEF SUMMARY

In order to address the need for improved memory system performance, a method and system for providing data type and/or host file information to a memory system is disclosed.

According to a first aspect, a method of transferring data between a host system and a re-programmable non-volatile mass storage system includes identifying a data type of data to be transmitted next to the mass storage system and transmitting data type information to the mass storage system regarding the data type of the data to be transmitted next, without providing identification of a particular host file to which the data type information pertains, where the identified data type is a first data type. After transmitting the data type information, the method further includes transmitting logical block address (LBA) information associated with the data to be transmitted next, and transmitting the data to be transmitted next, to the mass storage system.

In another aspect, a method of transferring data between a host system and a re-programmable non-volatile mass storage system is disclosed. The method includes identifying a next data type of data to be transmitted next to the mass storage system. If the next data type differs from a previous data type of data last transmitted to the mass storage system, data type information is transmitted to the mass storage information regarding the next data type prior to transmitting data having the next data type. If the next data type is the same as the previous data type, the data having the next data type is transmitted without transmitting data type information regardless of whether the data having the next data type and the data last transmitted are related to a common host file.

Another aspect of the invention includes a computer readable medium having processor executable instructions for providing advance data type information to a mass storage system. The instructions are configured to cause a processor to identify a data type of data to be stored in the mass storage system and transmit data type information to the mass storage system regarding the data type of data to be transmitted next to the mass storage system, without providing identification of a particular host file to which the data type information pertains, where the data type comprises a first data type. After transmitting the data type information, data having the first data type, and logical block address (LBA) information associated with the data having the first data type, is transmitted to the mass storage system.

A computer readable medium comprising processor executable instructions for providing advance data type information to a mass storage system is disclosed according to another aspect. The instructions are configured to cause a processor to identify a next data type of data to be transmitted next to the mass storage system and, if the next data type differs from a previous data type of data last transmitted to the mass storage system, data type information is transmitted to the mass storage system regarding the next data type prior to transmitting data having the next data type. Alternatively, if the next data type is the same as the previous data type, the data having the next data type is transmitted without transmitting data type information regardless of whether the data having the next data type and the data last transmitted are related to a common host file.

In yet another aspect, a host system includes a processor and a mass storage system interface in communication with the processor, where the mass storage system interface is configured to transmit data to or receive data from a mass storage system. The host system also includes a host file system operative on the processor and configured to identify a data type of data to be stored in the mass storage system and to transmit data type information regarding the data type of data to be transmitted next to the mass storage system without providing identification of a particular host file to which the data type information pertains, where the data type comprises a first data type. The host file system is also operative to, after transmitting the data type information, transmit data having the first data type, and logical block address (LBA) information associated with the data having the first data type, to the mass storage system.

In another aspect, a host system may include a processor, a mass storage system interface configured to transmit data to or receive data from a mass storage system in communication with the processor, and a host file system. The host file system may be operative on the processor and configured to identify a next data type of data to be transmitted next to the mass storage system. If the next data type differs from a previous data type of data last transmitted to the mass storage system, the host file system is configured to transmit data type information to the mass storage system regarding the next data type prior to transmitting data having the next data type, and if the next data type is a same data type as the previous data type, the host file system is configured to transmit the data having the next data type without transmitting data type information regardless of whether the data having the next data type and the data last transmitted are related to a common host file.

According to another aspect, a method of providing both data type and host system file information is provided. The method may include identifying a data type of data to be transmitted next to a mass storage system, identifying a host system file associated with the data to be transmitted next and associating a host system file identifier to the data to be transmitted next, and transmitting information corresponding to the data type and the host system file identifier for the data to be transmitted next. Subsequent to transmitting information corresponding to the data type and the host file identifier, the method includes transmitting the data to be transmitted next in a logical block address (LBA) format.

A computer readable medium comprising processor executable instructions for providing advance data type information to a mass storage system is provided in another aspect. The instructions are configured to cause a processor to identify a data type of data to be stored in the mass storage system, identify a host system file associated with the data to be transmitted next and associate a host system file identifier to the data to be transmitted next, transmit information corresponding to the data type and the host system file identifier for the data to be transmitted next and, subsequent to transmitting information corresponding to the data type and the host file identifier, transmit the data to be transmitted next in a logical block address (LBA) format.

In yet another aspect, a host system includes a processor, a mass storage system interface in communication with the processor and a host file system operative on the processor. The host file system is configured to identify a data type of data to be stored in the mass storage system, identify a host system file associated with the data to be transmitted next and associate a host system file identifier to the data to be transmitted next, and transmit information corresponding to the data type and the host system file identifier for the data to be transmitted next. The host file system is further configured to, subsequent to transmitting information corresponding to the data type and the host file identifier, transmit the data to be transmitted next in a logical block address (LBA) format.

According to other aspects of the invention, methods and systems for providing file tagging information to a mass storage system without also providing data type tagging information, in addition to LBA addressed data, are disclosed. In one aspect, a method of transferring data between a host system and a re-programmable non-volatile mass storage system, the method includes identifying a host system file corresponding to data to be transmitted next to the mass storage system, transmitting host system file identifier information to the mass storage system regarding the host system file for the data to be transmitted next, without transmitting data type information for the data to be transmitted next and after transmitting the host system file identifier information, transmitting logical block address (LBA) information associated with the data to be transmitted next data, and the data to be transmitted next, to the mass storage system.

In another aspect, a computer readable medium comprised of processor executable instructions for providing advance data type information to a mass storage system is disclosed. The instructions are configured to cause a processor to identify a host system file corresponding to data to be transmitted next to the mass storage system, transmit host system file identifier information to the mass storage system regarding the host system file for the data to be transmitted next, without transmitting data type information for the data to be transmitted next and, after transmitting the host system file identifier information, transmitting logical block address (LBA) information associated with the data to be transmitted next data, and the data to be transmitted next, to the mass storage system.

According to another aspect, a host system is disclosed having a processor, a mass storage system interface in communication with the processor, and a host file system operative on the processor. The host file system is configured to identify a host system file corresponding to data to be transmitted next to the mass storage system, transmit host system file identifier information to the mass storage system regarding the host system file for the data to be transmitted next, without transmitting data type information for the data to be transmitted next and, after transmitting the host system file identifier information, transmitting logical block address (LBA) information associated with the data to be transmitted next data, and the data to be transmitted next, to the mass storage system.

In another aspect of the invention, a method of transferring data between a host system and a re-programmable non-volatile mass storage system is disclosed. The method includes identifying at least one of a data type or a host system file associated with data to be transmitted next to the mass storage system and associating the data type or an identifier for the host system file to the data to be transmitted next. The method also includes transmitting information corresponding to at least one of the data type or the identifier for the host system file for the data to be transmitted next and, subsequent to transmitting this information, transmitting the data to be transmitted next in a logical block address (LBA) format.

Other features and advantages of the invention will become apparent upon review of the following drawings, detailed description and claims.

DETAILED DESCRIPTION

A flash memory system suitable for use in implementing aspects of the invention is shown in FIGS. 1-6. A host system 100 of FIG. 1 stores data into and retrieves data from a non-volatile memory 102 such as flash memory. The memory 102 is illustrated to be in the form of a card that is removably connected to the host through mating parts 104 and 106 of a mechanical and electrical connector. There are currently many different flash memory cards that are commercially available, examples being the CompactFlash (CF), the MultiMediaCard (MMC), Secure Digital (SD), miniSD, SmartMedia and TransFlash cards. Although each of these cards has a unique mechanical and/or electrical interface according to its standardized specifications, the flash memory system included in each is similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Figure 2:
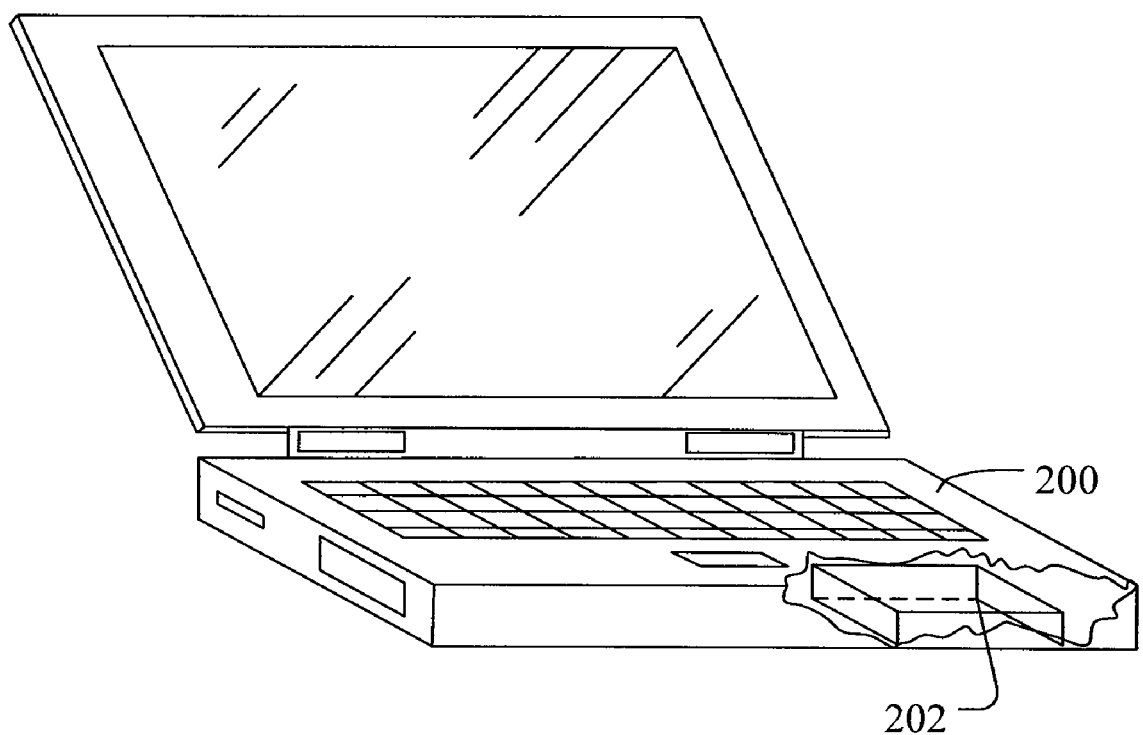
FIG. 2 is a sectional view of a laptop computer containing a solid state disk drive suitable for implementing the methods and systems described herein

Other forms of flash memory such as solid state disks may also be used as the memory system. As shown in FIG. 2, the host may be a laptop computer 200 that incorporates a built-in solid state disk (SSD) 202 comprised of flash-based memory. A SSD 202 may provide advantages over a typical hard disk drive, such as lower power consumption, smaller size, quieter operation, and faster read and write speeds.

The various systems that may use memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged. The memory system usually contains its own memory controller and drivers but there are also some memory-only systems that are instead controlled by software executed by the host to which the memory is connected. In some memory systems containing the controller, especially those embedded within a host, the memory, controller and drivers are often formed on a single integrated circuit chip.

Figure 1:
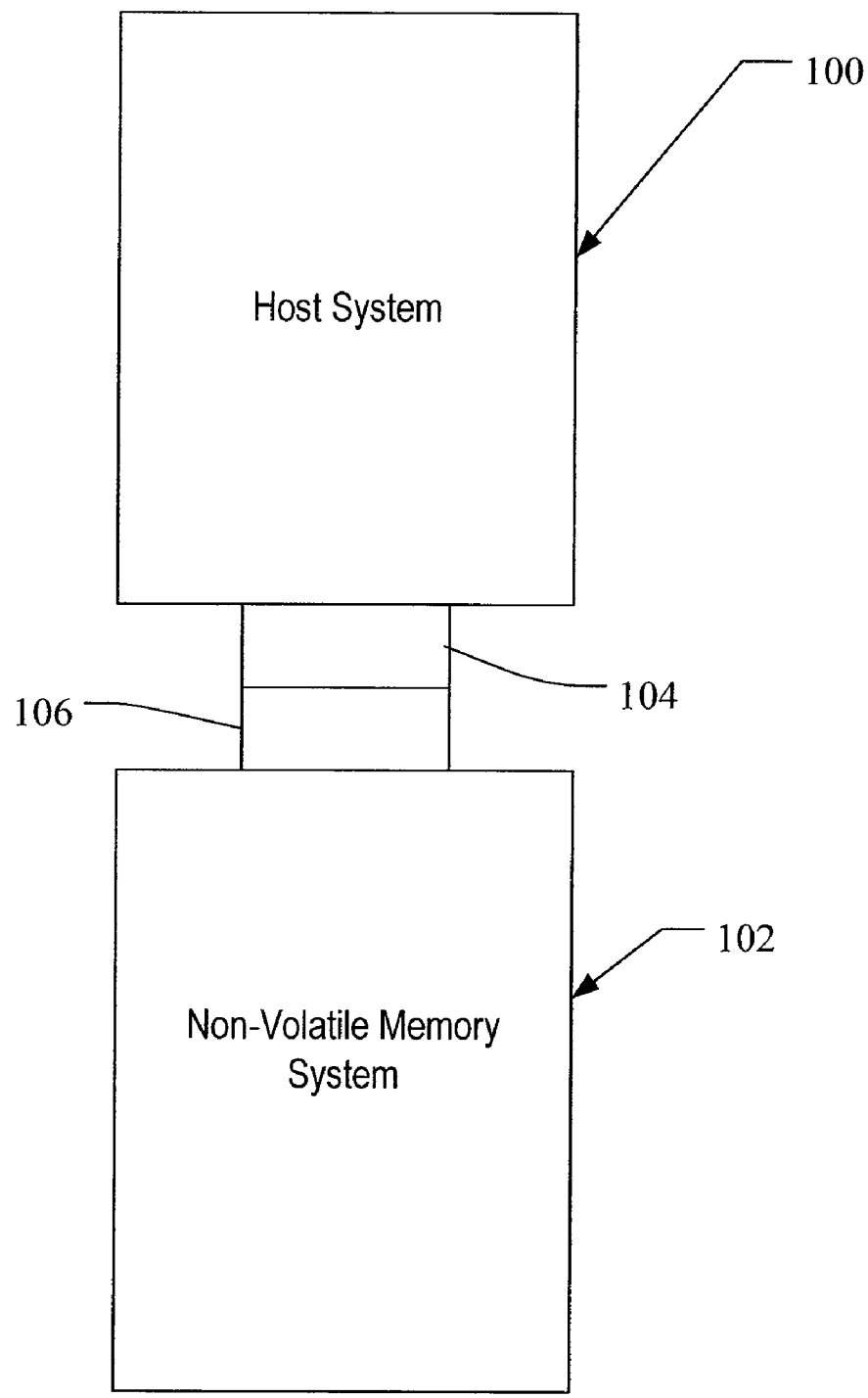
FIG. 1 schematically illustrates a host and a connected non-volatile memory system.
Figure 3:
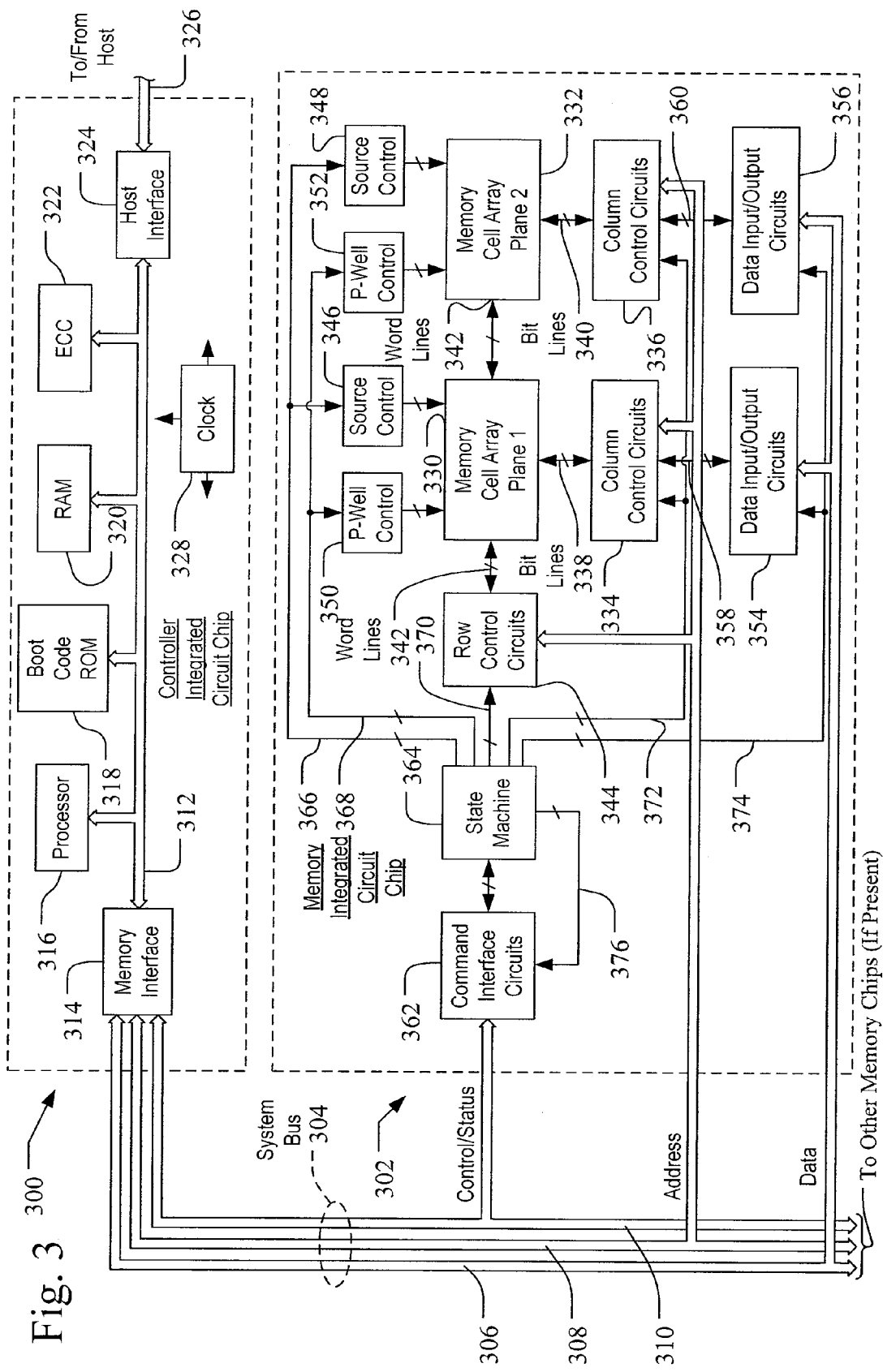
FIG. 3 is a block diagram of an example flash memory system for use as the non-volatile memory of FIG. 1 or 2.

The non-volatile memory system 102, 202 may include flash memory, and circuits that both interface with the host 100, 200 to which the card or SSD is connected for passing data back and forth and to control the memory. Referring to FIG. 3, circuitry of a typical flash memory system that may be used as the non-volatile memory system 102, 202 of FIGS. 1 and 2 is described. The system controller 300 typically converts between logical addresses of data used by the host 100, 200 and physical addresses of the memory 302 during data programming and reading. The controller 300 is usually implemented on a single integrated circuit chip that is connected in parallel with one or more integrated circuit memory chips over a system bus 304, a single such memory chip being shown in FIG. 2. The particular bus 304 that is illustrated includes a separate set of conductors 306 to carry data, a set 308 for memory addresses and a set 310 for control and status signals. Alternatively, a single set of conductors may be time shared between these three functions.

A typical controller chip 300 has its own internal bus 312 that interfaces with the system bus 304 through interface circuits 314. The primary functions normally connected to the bus are a processor 316 (such as a microprocessor or microcontroller), a read only memory (ROM) 318 containing code to initialize ("boot") the system, random access memory (RAM) 320 used primarily to buffer data being transferred between the memory and a host, and circuits 322 that calculate and check an error correction code (ECC) for data passing through the controller between the memory and the host. The controller bus 312 interfaces with a host system through circuits 324, which, in the case of the system of FIG. 1 being contained within a memory card, is done through external contacts 326 of the card that are part of the connector 106. A clock 328 is connected with and utilized by each of the other components of the controller 300.

The memory chip 302, as well as any other connected with the system bus 304, may contain an array of memory cells organized into multiple sub-arrays or planes, two such planes 330 and 332 being illustrated for simplicity but more, such as four or eight such planes, may instead be used. Alternatively, the memory cell array of the chip 302 may not be divided into planes. When so divided however, each plane has its own column control circuits 334 and 336 that are operable independently of each other. The circuits 334 and 336 receive addresses of their respective memory cell array from the address portion 308 of the system bus 304, and decode them to address a specific one or more of respective bit lines 338 and 340. The word lines 342 are addressed through row control circuits 344 in response to addresses received on the address bus 308. Source voltage control circuits 346 and 348 are also connected with the respective planes, as are p-well voltage control circuits 350 and 352. If the memory chip 302 has a single array of memory cells, and if two or more such chips exist in the system, the array of each chip may be operated similarly to a plane or sub-array within the multi-plane chip described above.

Data are transferred into and out of the planes 330 and 332 through respective data input/output circuits 354 and 356 that are connected with the data portion 306 of the system bus 304. The circuits 354 and 356 provide for both programming data into the memory cells and for reading data from the memory cells of their respective planes, through lines 358 and 360 connected to the planes through respective column control circuits 334 and 336.

Although the controller 300 controls the operation of the memory chip 302 to program data, read data, erase and attend to various housekeeping matters, each memory chip also contains some controlling circuitry that executes commands from the controller 300 to perform such functions. Interface circuits 362 are connected to the control and status portion 310 of the system bus 304. Commands from the controller are provided to a state machine 364 that then provides specific control of other circuits in order to execute these commands. Control lines 366, 368, 370, 372 and 374 connect the state machine 364 with these other circuits as shown in FIG. 3. Status information from the state machine 364 is communicated over lines 376 to the interface 362 for transmission to the controller 300 over the bus portion 310.

A NAND architecture of the memory cell arrays 330 and 332 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278.

Figure 4:
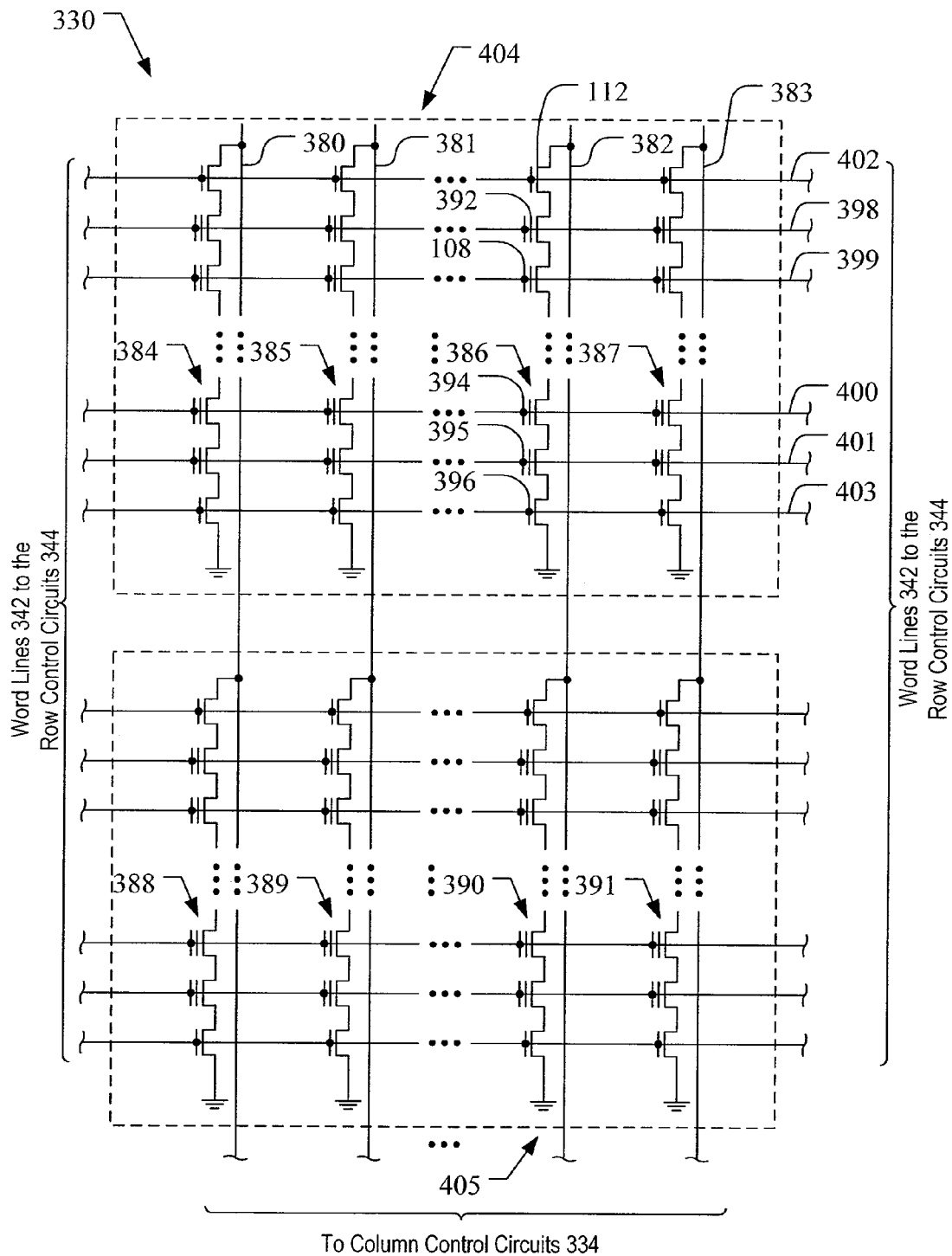
FIG. 4 is a representative circuit diagram of a memory cell array that may be used in the system of FIG. 3.

An example NAND array is illustrated by the circuit diagram of FIG. 4, which is a portion of the memory cell array 330 of the memory system of FIG. 3. A large number of global bit lines are provided, only four such lines 380-383 being shown in FIG. 4 for simplicity of explanation. A number of series connected memory cell strings 384-387 are connected between one of these bit lines and a reference potential. Using the memory cell string 386 as representative, a plurality of charge storage memory cells 392-395 are connected in series with select transistors 396 and 397 at either end of the string. When the select transistors of a string are rendered conductive, the string is connected between its bit line and the reference potential. One memory cell within that string is then programmed or read at a time.

Word lines 398-401 of FIG. 4 individually extend across the charge storage element of one memory cell in each of a number of strings of memory cells, and gates 402 and 403 control the states of the select transistors at each end of the strings. The memory cell strings that share common word and control gate lines 398-403 are made to form a block 403 of memory cells that are erased together. This block of cells contains the minimum number of cells that are physically erasable at one time. One row of memory cells, those along one of the word lines 398-401, are programmed at a time. Typically, the rows of a NAND array are programmed in a prescribed order, in this case beginning with the row along the word line 401 closest to the end of the strings connected to ground or another common potential. The row of memory cells along the word line 400 is programmed next, and so on, throughout the block 404. The row along the word line 398 is programmed last.

A second block 405 is similar, its strings of memory cells being connected to the same global bit lines as the strings in the first block 404 but having a different set of word and control gate lines. The word and control gate lines are driven to their proper operating voltages by the row control circuits 344. If there is more than one plane or sub-array in the system, such as planes 1 and 2 of FIG. 3, one memory architecture uses common word lines extending between them. There can alternatively be more than two planes or sub-arrays that share common word lines. In other memory architectures, the word lines of individual planes or sub-arrays are separately driven.

As described in several of the NAND patents and published application referenced above, the memory system may be operated to store more than two detectable levels of charge in each charge storage element or region, thereby to store more than one bit of data in each. The charge storage elements of the memory cells are most commonly conductive floating gates but may alternatively be non-conductive dielectric charge trapping material, as described in U.S. patent application publication no. 2003/0109093.

Figure 5:
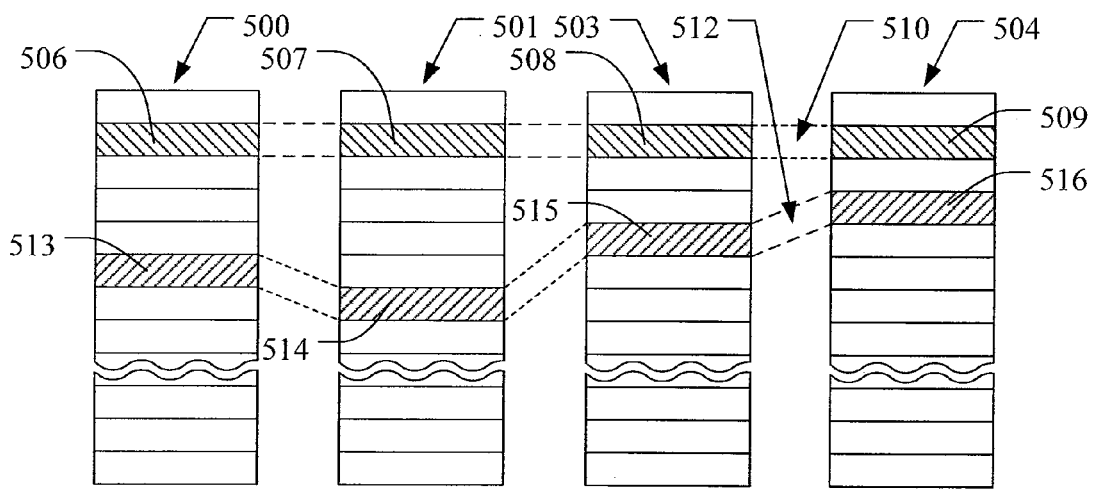
FIG. 5 illustrates an example physical memory organization of the system of FIG. 3.

FIG. 5 conceptually illustrates an organization of a flash memory cell array in the non-volatile memory 102 (FIG. 1) that is used as an example in further descriptions below. Four planes or sub-arrays 500-503 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 5 by rectangles, such as blocks 506, 507, 508 and 509, located in respective planes 500-503. There can be dozens or hundreds of blocks in each plane.

As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 506-509 are shown to form one metablock 510. All of the cells within a metablock are typically erased together. The blocks used to form a metablock need not be restricted to the same relative locations within their respective planes, as is shown in a second metablock 512 made up of blocks 513-516. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 6:
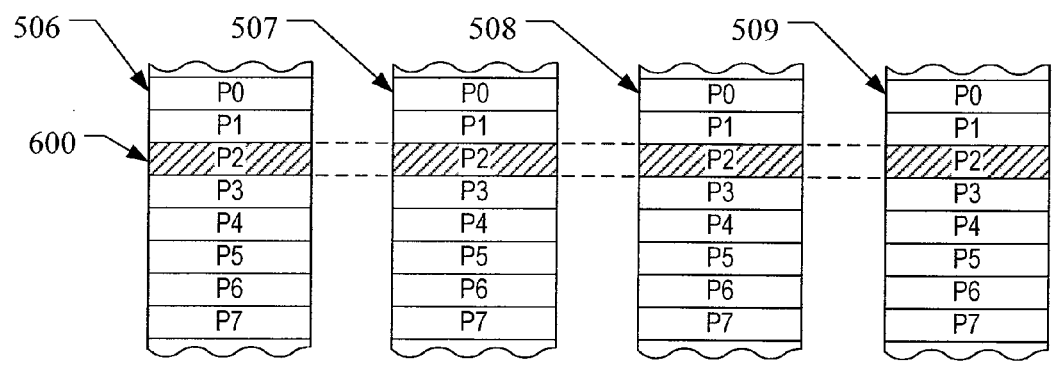
FIG. 6 shows an expanded view of a portion of the physical memory of FIG. 5.

The individual blocks are in turn divided for operational purposes into pages of memory cells, as illustrated in FIG. 6. The memory cells of each of the blocks 506-509, for example, are each divided into eight pages P0-P7. Alternatively, there may be 16, 32 or more pages of memory cells within each block. The page is the unit of data programming and reading within a block, containing the minimum amount of data that are programmed or read at one time. In the NAND architecture of FIG. 4, a page is formed of memory cells along a word line within a block. However, in order to increase the memory system operational parallelism, such pages within two or more blocks may be logically linked into metapages. A metapage 600 is illustrated in FIG. 6, being formed of one physical page from each of the four blocks 506-509. The metapage 600, for example, includes the page P2 in of each of the four blocks but the pages of a metapage need not necessarily have the same relative position within each of the blocks. A metapage is the maximum unit of programming.

Although it is preferable to program and read the maximum amount of data in parallel across all four planes, for high system performance, the memory system can also be operated to form metapages of any or all of one, two or three pages in separate blocks in different planes. This allows the programming and reading operations to adaptively match the amount of data that may be conveniently handled in parallel and reduces the occasions when part of a metapage remains unprogrammed with data.

A metapage 600 formed of physical pages of multiple planes, as illustrated in FIG. 6, contains memory cells along word line rows of those multiple planes. Rather than programming all of the cells in one word line row at the same time, they are more commonly alternately programmed in two or more interleaved groups, each group storing a page of data (in a single block) or a metapage of data (across multiple blocks). By programming alternate memory cells at one time, a unit of peripheral circuits including data registers and a sense amplifier need not be provided for each bit line but rather are time-shared between adjacent bit lines. This economizes on the amount of substrate space required for the peripheral circuits and allows the memory cells to be packed with an increased density along the rows. Otherwise, it is preferable to simultaneously program every cell along a row in order to maximize the parallelism available from a given memory system.

With reference to FIG. 4, the simultaneous programming of data into every other memory cell along a row is most conveniently accomplished by providing two rows of select transistors (not shown) along at least one end of the NAND strings, instead of the single row that is shown. The select transistors of one row then connect every other string within a block to their respective bit lines in response to one control signal, and the select transistors of the other row connect every other string to their respective bit lines in response to another control signal. Two pages of data are therefore written into each row of memory cells.

Figure 7:
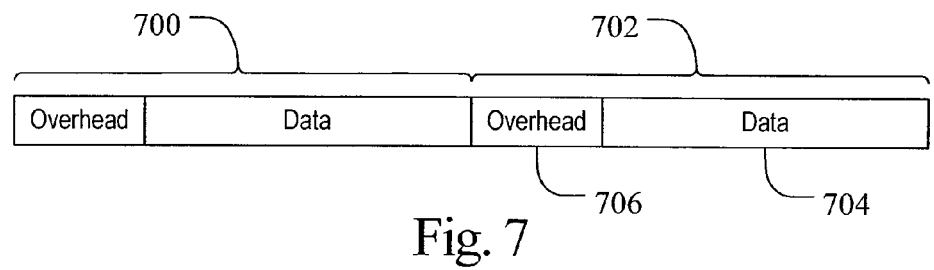
FIG. 7 shows a further expanded view of a portion of the physical memory of FIGS. 5 and 6.

The amount of data in each logical page is typically an integer number of one or more sectors of data, each sector containing 512 bytes of data, by convention. The sector is the minimum unit of data transferred to and from the memory system. FIG. 7 shows a logical data page of two sectors 700 and 702 of data of a page or metapage. Each sector usually contains a portion 704 of 512 bytes of user or system data being stored and another number of bytes for overhead data 706 related either to the data in the portion 704 or to the physical page or block in which it is stored. The number of bytes of overhead data 706 is typically 16 bytes, making the total 528 bytes for each of the sectors 700 and 702. The overhead portion 706 may contain an ECC calculated from the data portion 704 during programming, its logical address, an experience count of the number of times the block has been erased and re-programmed, one or more control flags, operating voltage levels, and/or the like, plus an ECC calculated from such overhead data 706. Alternatively, the overhead data 706, or a portion of it, may be stored in different pages in other blocks. In either case, a sector denotes a unit of stored data with which an ECC is associated.

As the parallelism of memories increases, data storage capacity of the metablock increases and the size of the data page and metapage also increase as a result. The data page may then contain more than two sectors of data. With two sectors in a data page, and two data pages per metapage, there are four sectors in a metapage. Each metapage thus stores 2048 bytes of data. This is a high degree of parallelism, and can be increased even further as the number of memory cells in the rows is increased. For this reason, the width of flash memories is being extended in order to increase the amount of data in a page and a metapage.

The physically small re-programmable non-volatile memory cards and flash drives identified above are commercially available with various data storage capacities. The host manages data files generated or used by application software or firmware programs executed by the host. Word processing data files and drawing files of computer aided design (CAD) software are examples of data files generated by application software in general computer hosts such as PCs, laptop computers and the like. A digital camera generates a data file for each picture that is stored on a memory card. A cellular telephone utilizes data from files on an internal memory card, such as a telephone directory. A PDA stores and uses several different files, such as an address file, a calendar file, and the like. In any such application, the memory card may also contain software that operates the host.

Figure 8:
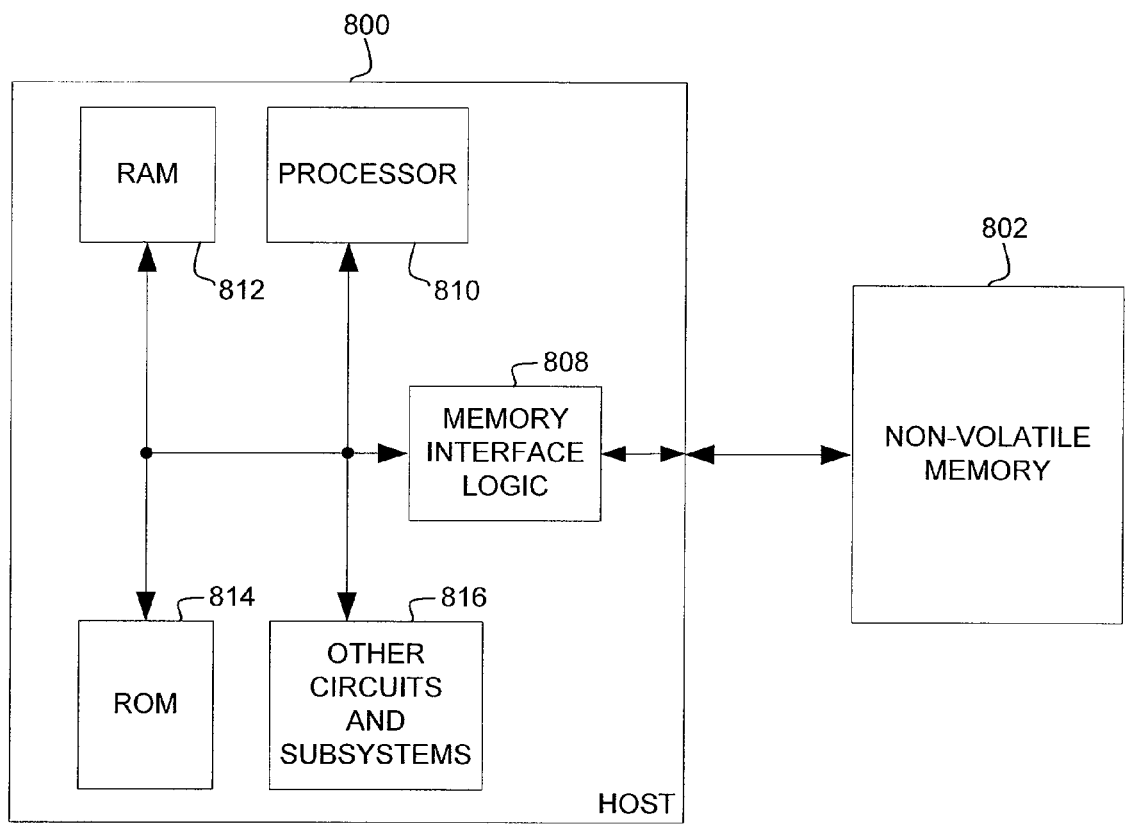
FIG. 8 is a block diagram of a host that may implement the method of providing host file and LBA information disclosed herein.

FIG. 8 is a more detailed block diagram of an embodiment of a host system 800. Data transfers between the host 800 and the non-volatile memory 802 are made through the memory interface logic 808. The host 800 may also include a microprocessor 810, a read-only memory (ROM) 812 for storing firmware code, and a random access memory (RAM) 814. Other circuits and subsystems 816 may include a high capacity magnetic data storage disk drive, and user interface circuitry such as a keyboard, a keypad, a monitor, or display, depending upon the particular host system.

If the host 800 is a PC, for example, the RAM 812 or other circuits and subsystems 816 may include word processing, graphics, control or other popular application software executable by the processor 810. If the host 800 is a camera, cellular telephone or other host system that is primarily dedicated to performing a single set of functions, the applications may include software that operates the camera to take and store pictures, the cellular telephone to make and receive calls, and the like. In embodiments where the host 800 is a PC, the memory interface logic 808 may be structured to assign addresses in a logical address space to data that is managed by the host. The host 800 may include a host file system that manages the memory allocations made by the host to files managed on the host and stored in one or more memory devices. The host file system may be part of an operating system stored in software, firmware or a combination of software and firmware.

Figure 9:
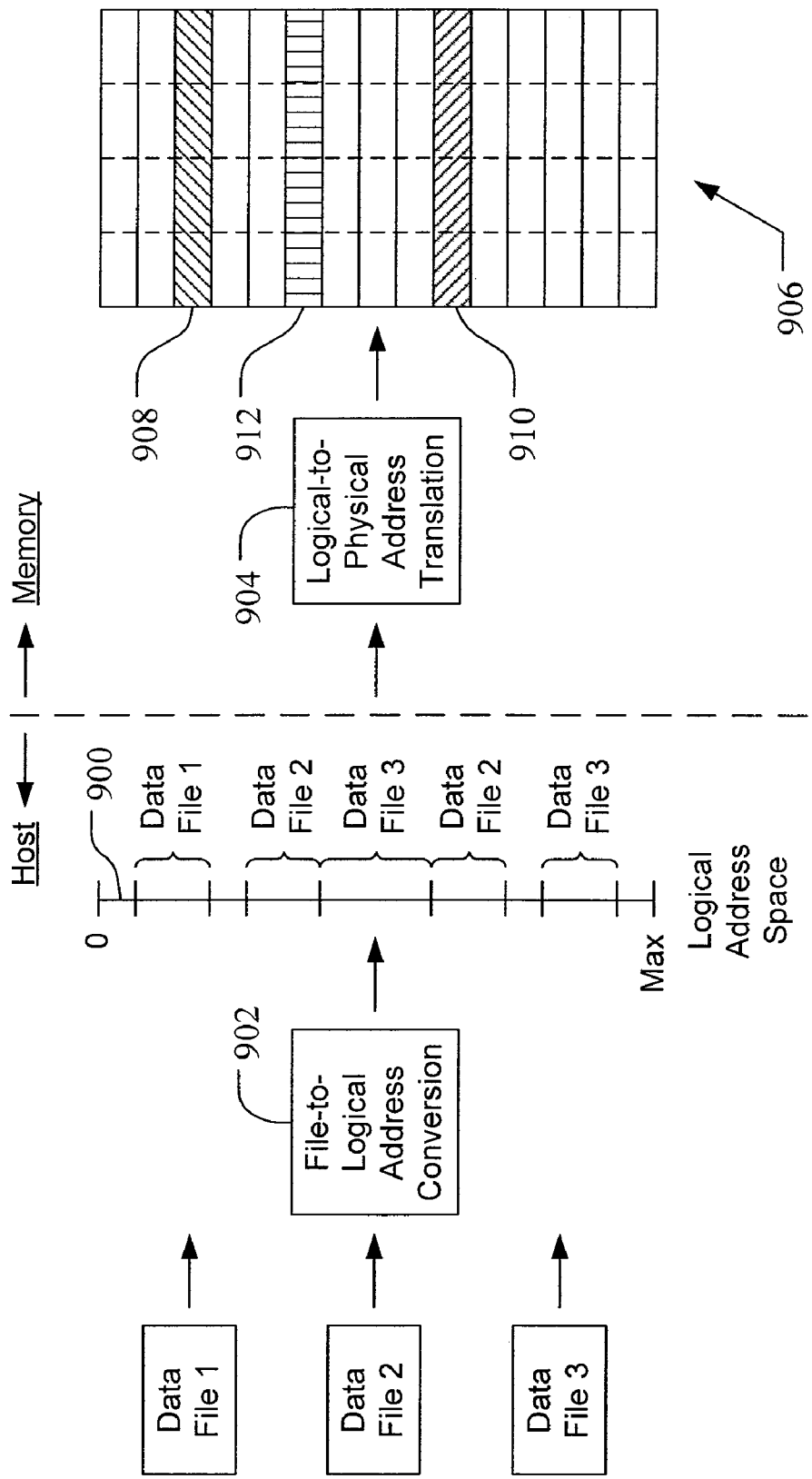
FIG. 9 illustrates a logical address space interface between a host and a re-programmable memory system.

A common logical interface between a host and a memory system is illustrated in FIG. 9. A continuous logical address space 900 is large enough to provide addresses for all the data that may be stored in the memory system. The host address space is typically divided into increments of clusters of data. Each cluster may be designed in a given host system to contain a number of sectors of data, somewhere between 4 and 64 sectors being typical. A standard sector contains 512 bytes of data.

Three Data Files 1, 2 and 3 are shown in the example of FIG. 9 to have been created. An application program running on the host system creates each file as an ordered set of data and identifies it by a unique name or other reference. Enough available logical address space not already allocated to other files is assigned by the host to Data File 1, by a file-to-logical address conversion 902. Data File 1 is shown to have been assigned a contiguous range of available logical addresses. Ranges of addresses are also commonly allocated for specific purposes, such as a particular range for the host operating software, which are then avoided for storing data even if these addresses have not been utilized at the time the host is assigning logical addresses to the data.

When a Data File 2 is later created by the host, the host similarly assigns two different ranges of contiguous addresses within the logical address space 900, by the file-to-logical address conversion 902 of FIG. 9. A file need not be assigned contiguous logical addresses but rather can be fragments of addresses in between address ranges already allocated to other files. This example then shows that yet another Data File 3 created by the host is allocated other portions of the host address space not previously allocated to the Data Files 1 and 2 and other data.

The host keeps track of the memory logical address space by maintaining a file allocation table (FAT), where the logical addresses assigned by the host to the various host files by the conversion 902 are maintained. The FAT table is frequently updated by the host as new files are stored, other files deleted, files modified and the like. The FAT table is typically stored in a host memory, with a copy also stored in the non-volatile memory that is updated from time to time. The copy is typically accessed in the non-volatile memory through the logical address space just like any other data file. When a host file is deleted, the host then deallocates the logical addresses previously allocated to the deleted file by updating the FAT table to show that they are now available for use with other data files.

The host is not concerned about the physical locations where the memory system controller chooses to store the files. The typical host only knows its logical address space and the logical addresses that it has allocated to its various files. The memory system, on the other hand, through the typical host/card interface being described, only knows the portions of the logical address space to which data have been written but does not know the logical addresses allocated to specific host files, or even the number of host files. The memory system controller converts the logical addresses provided by the host for the storage or retrieval of data into unique physical addresses within the flash memory cell array where host data are stored. A block 904 represents a working table of these logical-to-physical address conversions, which is maintained by the memory system controller.

The memory system controller is programmed to store data within the blocks and metablocks of a memory array 906 in a manner to maintain the performance of the system at a high level. Four planes or sub-arrays are used in this illustration. Data are preferably programmed and read with the maximum degree of parallelism that the system allows, across an entire metablock formed of a block from each of the planes. At least one metablock 908 is usually allocated as a reserved block for storing operating firmware and data used by the memory controller. Another metablock 910, or multiple metablocks, may be allocated for storage of host operating software, the host FAT table and the like. Most of the physical storage space remains for the storage of data files. The memory controller does not know, however, how the data received has been allocated by the host among its various file objects. All the memory controller typically knows from interacting with the host is that data written by the host to specific logical addresses are stored in corresponding physical addresses as maintained by the controller's logical-to-physical address table 904.

In a typical memory system, a few extra blocks of storage capacity are provided than are necessary to store the amount of data within the address space 900. One or more of these extra blocks may be provided as redundant blocks for substitution for other blocks that may become defective during the lifetime of the memory. The logical grouping of blocks contained within individual metablocks may usually be changed for various reasons, including the substitution of a redundant block for a defective block originally assigned to the metablock. One or more additional blocks, such as metablock 912, are typically maintained in an erased block pool. Most of the remaining metablocks shown in FIG. 9 are used to store host data. When the host writes data to the memory system, the function 904 of the controller converts the logical addresses assigned by the host to physical addresses within a metablock in the erased block pool. Other metablocks not being used to store data within the logical address space 900 are then erased and designated as erased pool blocks for use during a subsequent data write operation. In a preferred form, the logical address space is divided into logical groups that each contain an amount of data equal to the storage capacity of a physical memory metablock, thus allowing a one-to-one mapping of the logical groups into the metablocks.

Figure 10:
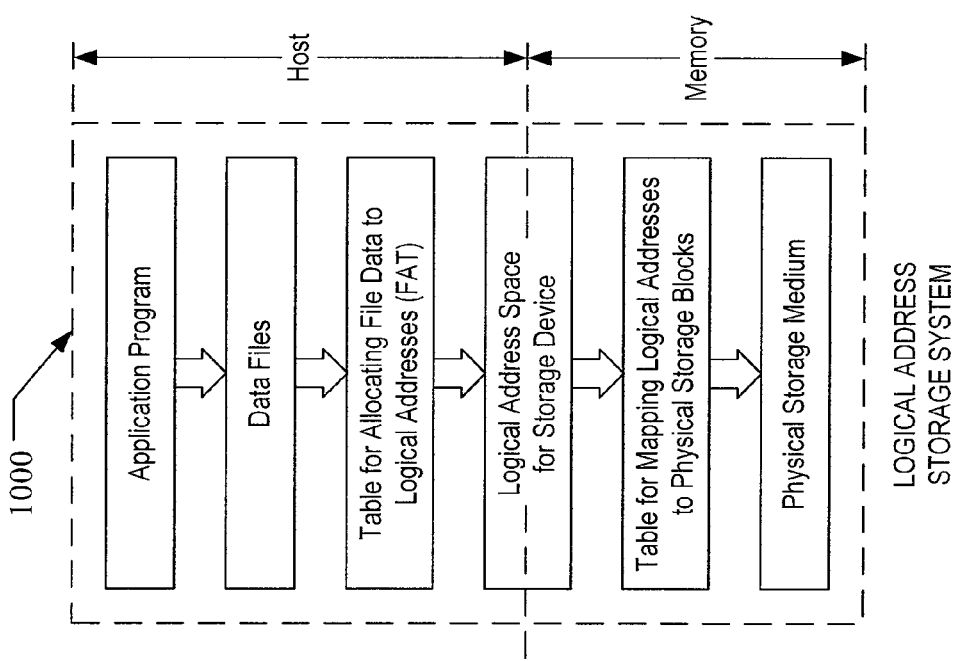
FIG. 10 illustrates in a different manner than FIG. 9 a logical address space interface between a host and a re-programmable memory system.

Referring to FIG. 10, a data flow 1000 of the typical logical address host/memory interface as already shown in FIG. 9 is illustrated differently. The host generated data files are allocated logical addresses by the host 800. The memory system 802 then sees these logical addresses and maps them into physical addresses of blocks of memory cells in the memory system's physical storage medium where the data are actually stored.

Data stored at specific host logical addresses are frequently overwritten by new data as the original stored data become obsolete. The memory system controller, in response, writes the new data in an erased block and then changes the logical-to-physical address table for those logical addresses to identify the new physical block to which the data at those logical addresses are stored. The blocks containing the original data at those logical addresses are then erased and made available for the storage of new data. Such erasure often must take place before a current data write operation may be completed if there is not enough storage capacity in the pre-erased blocks from the erase block pool at the start of writing. This can adversely impact the system data programming speed. The memory controller typically learns that data at a given logical address has been rendered obsolete by the host only when the host writes new data to their same logical address. Many blocks of the memory can therefore be storing such invalid data for a time.

The sizes of blocks and metablocks are increasing in order to efficiently use the area of the integrated circuit memory chip. This results in a large proportion of individual data writes storing an amount of data that is less than the storage capacity of a metablock, and in many cases even less than that of a block. Since the memory system controller normally directs new data to an erased pool metablock, this can result in portions of metablocks going unfilled. If the new data are updates of some data stored in another metablock, remaining valid metapages of data from that other metablock having logical addresses contiguous with those of the new data metapages are also desirably copied in logical address order into the new metablock. The old metablock may retain other valid data metapages. This results over time in data of certain metapages of an individual metablock being rendered obsolete and invalid, and replaced by new data with the same logical address being written to a different metablock.

In order to maintain enough physical memory space to store data over the entire logical address space 900, such data are periodically compacted or consolidated (garbage collection). It is also desirable to maintain sectors of data within the metablocks in the same order as their logical addresses as much as practical, since this makes reading data in contiguous logical addresses more efficient. So data compaction and garbage collection are typically performed with this additional goal. Some aspects of managing a memory when receiving partial block data updates and the use of metablocks are described in U.S. Pat. No. 6,763,424.

Data compaction typically involves reading all valid data metapages from a metablock and writing them to a new block, ignoring metapages with invalid data in the process. The metapages with valid data are also preferably arranged with a physical address order that matches the logical address order of the data stored in them. The number of metapages occupied in the new metablock will be less than those occupied in the old metablock since the metapages containing invalid data are not copied to the new metablock. The old block is then erased and made available to store new data. The additional metapages of capacity gained by the consolidation can then be used to store other data.

During garbage collection, metapages of valid data with contiguous or near contiguous logical addresses are gathered from two or more metablocks and re-written into another metablock, usually one in the erased block pool. When all valid data metapages are copied from the original two or more metablocks, they may be erased for future use.

Data consolidation and garbage collection take time and can affect the performance of the memory system, particularly if data consolidation or garbage collection needs to take place before a command from the host can be executed. Such operations are normally scheduled by the memory system controller to take place in the background as much as possible but the need to perform these operations can cause the controller to have to give the host a busy status signal until such an operation is completed. An example of where execution of a host command can be delayed is where there are not enough pre-erased metablocks in the erased block pool to store all the data that the host wants to write into the memory, so data consolidation or garbage collection is needed first to clear one or more metablocks of valid data, which can then be erased. Attention has therefore been directed to managing control of the memory in order to minimize such disruptions. Many such techniques are described in the following United States patent applications, referenced hereinafter as the "LBA patent applications": Ser. No. 10/749,831, filed Dec. 30, 2003, entitled "Management of Non-Volatile Memory Systems Having Large Erase Blocks"; Ser. No. 10/750,155, filed Dec. 30, 2003, entitled "Non-Volatile Memory and Method with Block Management System"; Ser. No. 10/917,888, filed Aug. 13, 2004, entitled "Non-Volatile Memory and Method with Memory Planes Alignment"; Ser. No. 10/917,867, filed Aug. 13, 2004; Ser. No. 10/917,889, filed Aug. 13, 2004, entitled "Non-Volatile Memory and Method with Phased Program Failure Handling"; Ser. No. 10/917,725, filed Aug. 13, 2004, entitled "Non-Volatile Memory and Method with Control Data Management"; Ser. No. 11/192,220, filed Jul. 27, 2005, entitled "Non-Volatile Memory and Method with Multi-Stream Update Tracking"; Ser. No. 11/192,386, filed Jul. 27, 2005, entitled "Non-Volatile Memory and Method with Improved Indexing for Scratch Pad and Update Blocks"; and Ser. No. 11/191,686, filed Jul. 27, 2005, entitled "Non-Volatile Memory and Method with Multi-Stream Updating", and these applications are hereby incorporated herein by reference.

The memory controller may also use data from the FAT table, which is stored by the host in the non-volatile memory, to more efficiently operate the memory system. One such use is to learn when data has been identified by the host to be obsolete by deallocating their logical addresses. Knowing this allows the memory controller to schedule erasure of the blocks containing such invalid data before it would normally learn of it by the host writing new data to those logical addresses. This is described in U.S. patent application Ser. No. 10/897,049, filed Jul. 21, 2004, entitled "Method and Apparatus for Maintaining Data on Non-Volatile Memory Systems." Other techniques include monitoring host patterns of writing new data to the memory in order to deduce whether a given write operation is a single file, or, if multiple files, where the boundaries between the files lie. U.S. patent application Ser. No. 11/022,369, filed Dec. 23, 2004, entitled "FAT Analysis for Optimized Sequential Cluster Management," describes the use of techniques of this type. Similar techniques may be used in other files systems. For example, in memory devices operating using NTFS a review of the $bitmap file accessible via the MFT may be used to interpret file information.

To operate the memory system efficiently, it is desirable for the controller to know as much about the logical addresses assigned by the host to data of its individual files as it can. Data files can then be stored by the controller within a single metablock or group of metablocks, rather than being scattered among a larger number of metablocks when file boundaries are not known. The result is that the number and complexity of data consolidation and garbage collection operations are reduced. The performance of the memory system improves as a result. But it is difficult for the memory controller to know much about the host data file structure when the host/memory interface includes the logical address space 900 (FIG. 9), as described above.

In order to permit a memory system 802 the opportunity of improving performance, the host system 800 may incorporate functionality in the operating system or host file system applications on the host to provide information in addition the LBA address to the memory system 802. This additional information may relate to the host file for which the data is associated, the type of data, or a combination of this information. In one embodiment, the additional information may be transmitted immediately prior to the data next scheduled to be written to the memory device. The additional information may then be followed by the LBA address information and then the data associated with the LBA address information and additional information. In the following discussion, information about the host file that the next data transmission belongs to is referred to as file tagging and information about the type of data is referred to as data type tagging.

File Tagging

In one embodiment, the host 800 maintains its memory space in an LBA format, but is modified to enhance compatibility with memory devices that have the capability to accept and use additional information relating to file correlation information. This information allows all related data to be associated with a specific file or a specific metafile.

In this embodiment, the host 800 is configured to generate a set of commands to convey the file association information and notification of when a file is deleted within the host's file system. These file tagging commands may be included as extensions to the interface protocol, and may be implemented as reserved codes in the legacy LBA interface command set. The commands may be transmitted from the host to the memory system via reserved or unallocated command codes in a standard communication interface. Examples of suitable interfaces include the ATA interface, for solid state disks, or ATA-related interfaces, for example those used in CF or SD memory cards. The host 800 only needs to provide the file tagging commands during a write-related operation and it is contemplated that the file tagging commands would not be used when data is being read at the LBA interface.

The file tagging commands set forth below each include one or more parameters. One of the parameters is an identifier (ID). A file or a metafile is identified in a file tagging command by an ID that is assigned by the host 800 when the file is created or opened. When the file is closed by the host, the ID is no longer associated with the file and is invalid unless it is re-used by the host when another file is opened. The ID values are all invalid when power is first applied to the memory system. Another parameter that may be passed in a file tagging command is the file type. This parameter may have a value that designates between files and metafiles, for example it may take the value "metafile". Also, an identifying address (IA) parameter may be used in a file tagging command. The IA is any LBA address at which data for the file is currently stored. The IA may be the LBA address of the start of the file and is used to identify an existing file when the file is opened and an identifier is assigned by the host.

The host 800, although handling data in a LBA format, includes a file tagging command set that may be related to a set of commands the memory system 802 is capable of using internally to organize received data. One such memory format, which is known as direct file storage (DFS) and that works to store data on the memory system 802 based on the host file the data belongs to, is described in greater detail below. The host 800, by using such a command set, can then assist the memory system 802 in providing information to create highly correlated data objects while not knowing or needing to know how the data is stored in the memory system 802, other than by LBA address. The file tagging commands issued by a host 800 may include the following:

$identify: This file tagging command is a query sent to a memory system during initialization of the memory system to alert the memory system that the host is capable of providing file tagging information. The host 800 may exchange handshake information with the memory system 802 to verify that the memory system is capable of utilizing information in addition to LBA addresses to organize data, and thus the desire for the host to provide file tagging information.

$create <ID> <type>: This file tagging command provides notification that a new file has been created and should be opened, and has been assigned identifier value <ID>. The <type> parameter is optional and, as noted above, may take a value such as "metafile". The $create command should be passed before any other command relating to the file that has been created by the host. In one implementation, the ID may be session related so that it will always identify a particular file between host power-ups, but can be different for the same file the next time the host is powered up. In other embodiments, the ID may be permanently assigned to a file so that it is the identical ID is used by the host for a particular host file regardless whether that host application file is currently open or power is cycled (i.e. the host saves the ID in non-volatile memory or has some other mechanism for generating the identical ID for the file at each power-up).

$open <ID> <IA>: This file tagging command provides notification to the interface adapter 1608 that a closed file with identifying address <IA> has been opened by the host and has been assigned identifier value <ID>. The $open command should be passed before any other command relating to the file that has been opened by the host.

$file <ID>: This file tagging command provides notification that the following data relates to the open file with identifier value <ID>. The $file command should be passed before any write command for data for which the file has changed from that for the previous data.

$close <ID>: This file tagging command provides notification that the open file with identifier value <ID> has been closed by the host. The $close command should be passed before any command to open another file.

$delete <ID>: This file tagging command provides notification that the open file with identifier value <ID> has been deleted by the host. The $delete command should be passed before any cluster addresses previously allocated to the file are re-allocated.

$free <start> <length>: This file tagging command provides notification that the run of sequential clusters with starting LBA and length in clusters defined by <start> and <length>, which was previously allocated to a file that has not been deleted, has been designated free. The $free command should be passed before any of the designated cluster addresses is re-allocated.

Figure 11:
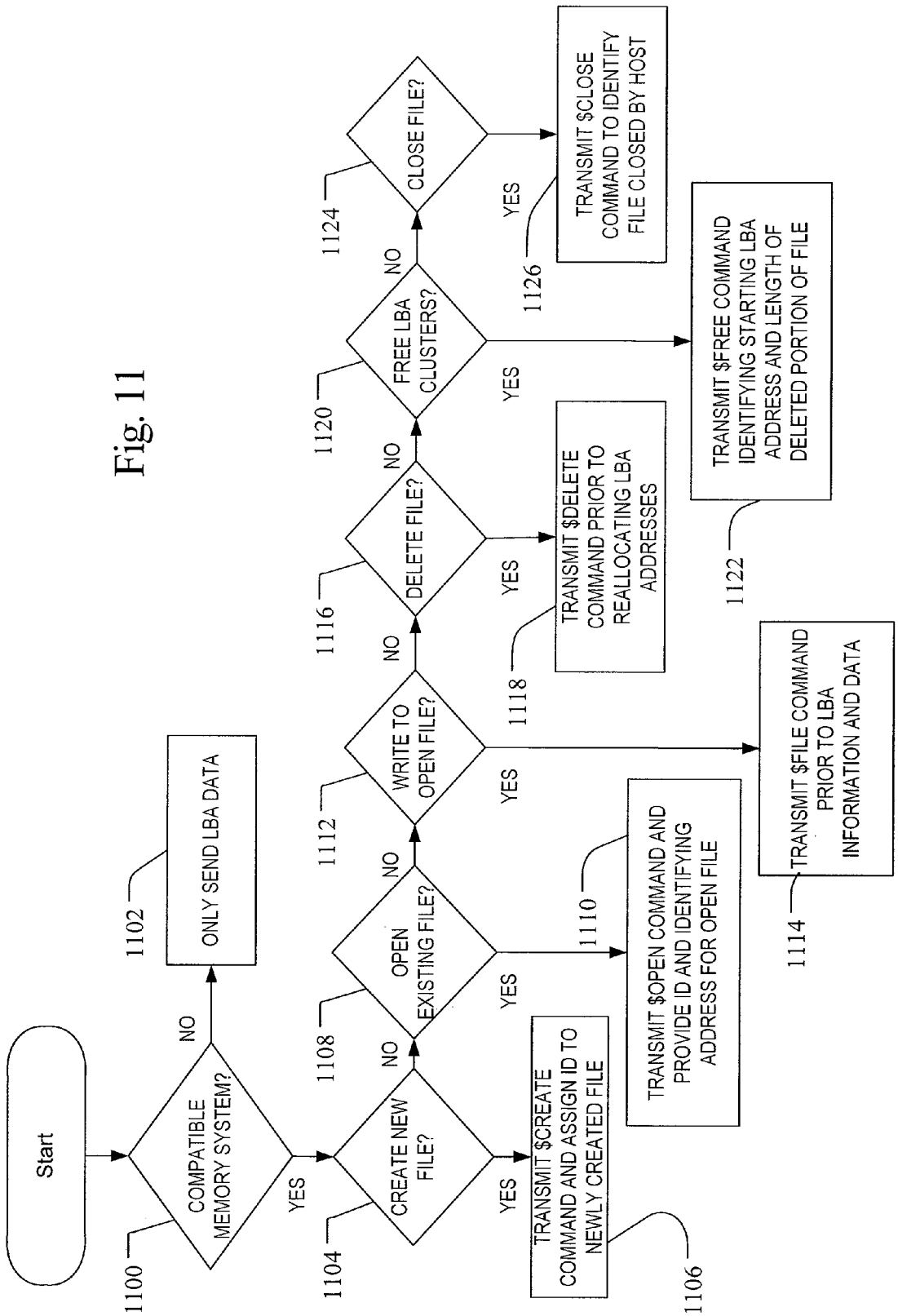
FIG. 11 is a flow diagram of a host process of providing file tagging commands to a memory system via an LBA interface.

Referring to FIG. 11, the host 800 may optionally check for memory device compatibility when the power is cycled to verify that the memory device 802 is capable of using file tagging information (at 1100). If the memory device 802 fails to provide an indication that it is capable of, or desires, the file tagging information, the host 800 will only send data with LBA address information to the memory system 802 (at 1102). If the host 800 is coupled to a predetermined internal drive, such as an SSD, there may be no need to perform this step because the capabilities of the memory device may already be known. Because even an internal drive may be replaced, however, the host can be configured to always verify memory device capability. For external memory systems, the determination may always be necessary as the capabilities of the possible external memory systems, such as removable flash media cards, may vary. The determination of compatibility may be made by the host transmitting a code or query to the memory system and seeing if the memory system replies with a known response or handshake message indicative of the file tagging capability.

Assuming that the memory system 802 is capable of using file tagging information, the host 802 will analyze the data to be sent next, or that is being deleted, and select the appropriate one of the file tagging commands to send the memory system. If the host creates a new file (at 1104), for example if an application program on the host is used to create a new file, the host will send a $create command and an ID to the memory system prior to sending any data for the new file (at 1106). If the host is opening an existing file (at 1108) or writing to an already open file (at 1112) then the host will transmit a $open command with the file ID and the LBA address where the file with the ID is located (at 1110), or will transmit the $file command with ID for the file prior to writing to the data associated with the file (at 1114). In the situation where the host 800 plans to write to an already open file, the $file command may only be sent if the previous write command sent by the host was to a different host file. Thus, if the last write command was to the same host file as the next planned write command, the host may not send another file tagging command in one embodiment.

If the host is deleting an entire file (at 1116), the $delete command may be sent, with the ID the host has provided previously to the memory system, prior to the host reallocating the LBA addresses for the now deleted file to some other file (at 1118). Alternatively, if only a portion of a file is being deleted (at 1120), the host may transmit the $free command along with the starting LBA address and length of the deleted portion of the file (at 1122). If a file that is currently open on the host is being closed (at 1124), the host may transmit the $close command identifying with the ID parameter the file that is to be closed.

Data Type Tagging

In another approach, the host 800 may provide a data type tag to classify data that is about to be written by the host without providing any information relating the data to a particular host file. The knowledge of certain data classification information may be used within the memory system 820 to optimize the organization of stored data. In one embodiment, the data type tag may be sent independently of any other type of host file system file identification information so that the memory system may use this data type information alone to assist in how it may wish to store data of different data types.

For the data type tagging scheme to function, the host 800 may be configured to generate one or more commands to convey the data type association information to the memory system 802. Similar to the file tagging embodiment discussed above, the data type tagging command may be included as an extension to the interface protocol, and may be implemented as reserved codes in the legacy LBA interface command set. The command may be transmitted from the host to the memory device via reserved or unallocated command codes in a standard communication interface. Examples of suitable interfaces include the ATA interface, for solid state disks, or ATA-related interfaces, for example those used in CF or SD memory cards. The host would only need to provide the data type tagging command during a write-related operation and it is contemplated that the data type tagging command would not normally be required when data is being read. In other implementations, the data type tagging command may be used in read operations to achieve faster read operations.

The data type tagging command set forth below may include only a single parameter. For example, the data type tagging command may be: $tag <type>, where the <type> parameter indicates the data type of the next burst of data the host is sending out. The data type identified by this parameter may include "premium data" that is of a type that is to be maintained by a memory system in a specified partition, temporary file data such as that generated when browsing on the World Wide Web, and $MFT file data generated by systems utilizing the NTFS standard. The <type> parameter can also identify File Allocation Table (FAT) data, root directory data and subdirectory data for FAT file system information for systems. Additionally, the data type parameter may indicate file extension information for the data about to be transmitted by the host. In another embodiment, the <type> parameter may contain information on file size. The file size parameter may convey the exact size of the file to which the data being sent next belongs, or an approximate size of the file the next data burst belongs to, where the approximate size may be conveyed using one or more size thresholds in the type parameter. In yet other embodiments, the <type> parameter may be any of a number of other forms of data classification information usable by a memory system 802 to optimize organization of data.

Figure 12:
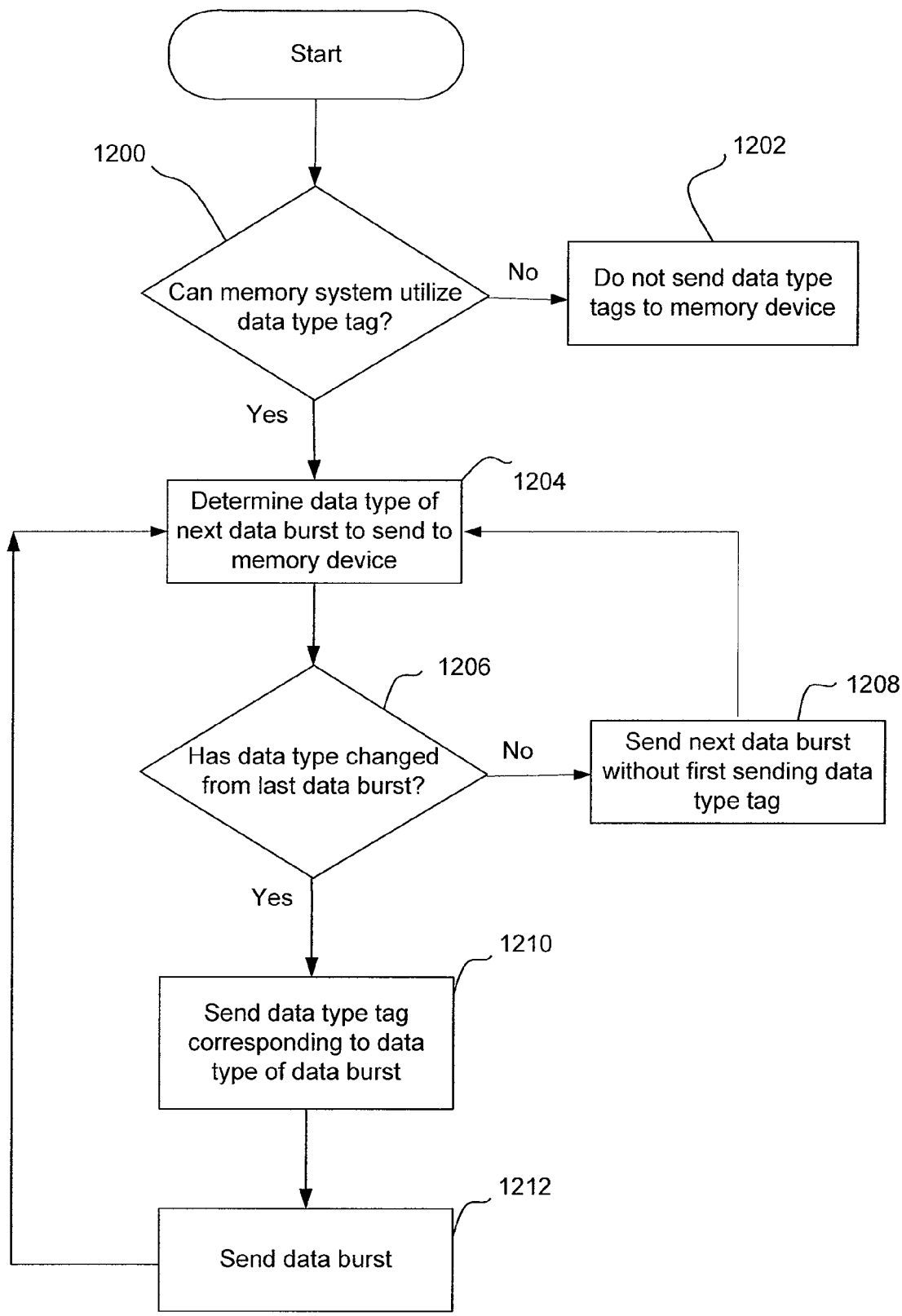
FIG. 12 is a flow diagram of a host process of providing data type tagging commands to a memory system via an LBA interface.

As with the file tagging embodiment described above, the host 800 may include a data type tagging command or command set that may be an abbreviated version of the set of commands used internally by a DFS format memory system or other format utilized by the memory system 820. Referring to FIG. 12, one method of a host providing data type tag information is illustrated. The host may optionally first determine if the memory system is capable of receiving or using data type tag information (at 1200). If the host is coupled to a predetermined internal drive, such as an SSD, there may be no need to perform this step because the capabilities of the memory device may already be known. For external memory systems, the determination may be necessary as the capabilities of the possible external memory systems, such as removable flash media cards, may vary. The determination may be made by the host transmitting a code or query to the memory system and seeing if the memory system replies with a known response or handshake message indicative of the data type tagging capability.

If the memory system cannot utilize the data type tags, the host will send write commands with LBA information and the corresponding data bursts to the memory system 802 without ever sending data type tagging commands (at 1202). If the memory system 820 is known or determined to have the ability to receive or use data type tags, the host 800 will determine the appropriate data type for the next burst of data scheduled to be written to the memory device (at 1204). If the data type tag is a file extension, such as a .tmp for temporary files data or a .mft for MFT data relating to NTFS system data, the host can readily determine the appropriate data type tag. If the host has a type of data it considers premium data, data which it classifies as needing to be stored in a different memory partition than other data in the memory system, it selects a data parameter accordingly. One example of a predetermined data type that a host may wish to have treated specially is file allocation table (FAT) data. Because FAT data is generally critical to the integrity of a memory system, the data type tagging information may label this as premium data in the <type> parameter so that the memory system can treat the data different. For example, by storing the FAT data in more robust binary (also known as single level cell or SLC flash) memory rather than multi-level cell flash memory (MLC).

After the data type of the next data burst scheduled to be transmitted from the host is determined by the host, the host checks to see if the determined data type differs from that of last burst of data sent out by the host to the memory system (at 1206). If the data type is the same as for the last data burst, the host will simply send the LBA information corresponding to the data and the data, regardless of whether the data burst relates to the same host file as the last data burst (at 1208). If the data burst has a data type that differs from the last data burst, the host will transmit the data type command ($tag <type>) to the memory system indicating the appropriate data type of the next data burst in the type parameter filed, and follow the data type command with the LBA information and associated data for the data burst (at 1210).

Combination File Tagging and Data Type Tagging

In other embodiments, the host 800 may be configured to provide both file tagging and data type tagging information to the memory device 820. In this embodiment, the $create command may include both a file ID parameter and a data type parameter that is transmitted to the memory device. As in the above file tagging only and data type tagging only embodiments, a combination command need only be sent with both the ID and the data type parameters if the last write command was for data from a different file than the data to be sent next by the host. Also, it is contemplated that only one of the parameters needs to be sent in a command after the initial combination file tagging and data type tagging command is sent.

Direct File Storage Systems

An example of a memory system that can take advantage of a host that is configured to provide file tagging, data type tagging or a combination of the two is now described. Although the following description focuses on a modified DFS arrangement, memory systems with other memory management arrangements are also contemplated.

By way of background, one memory management arrangement between a host and a memory system, termed a direct data file interface, also referred to as direct file storage (DFS), does not use the logical address space. The host instead logically addresses each file by a unique number, or other identifying reference, and offset addresses of units of data (such as bytes) within the file. This file address is given directly by the host to the memory system controller, which then keeps its own table of where the data of each host file are physically stored. This interface can be implemented with the same memory system as described above. The primary difference with what is described above is the manner in which that memory system communicates with a host system.

Figure 13:
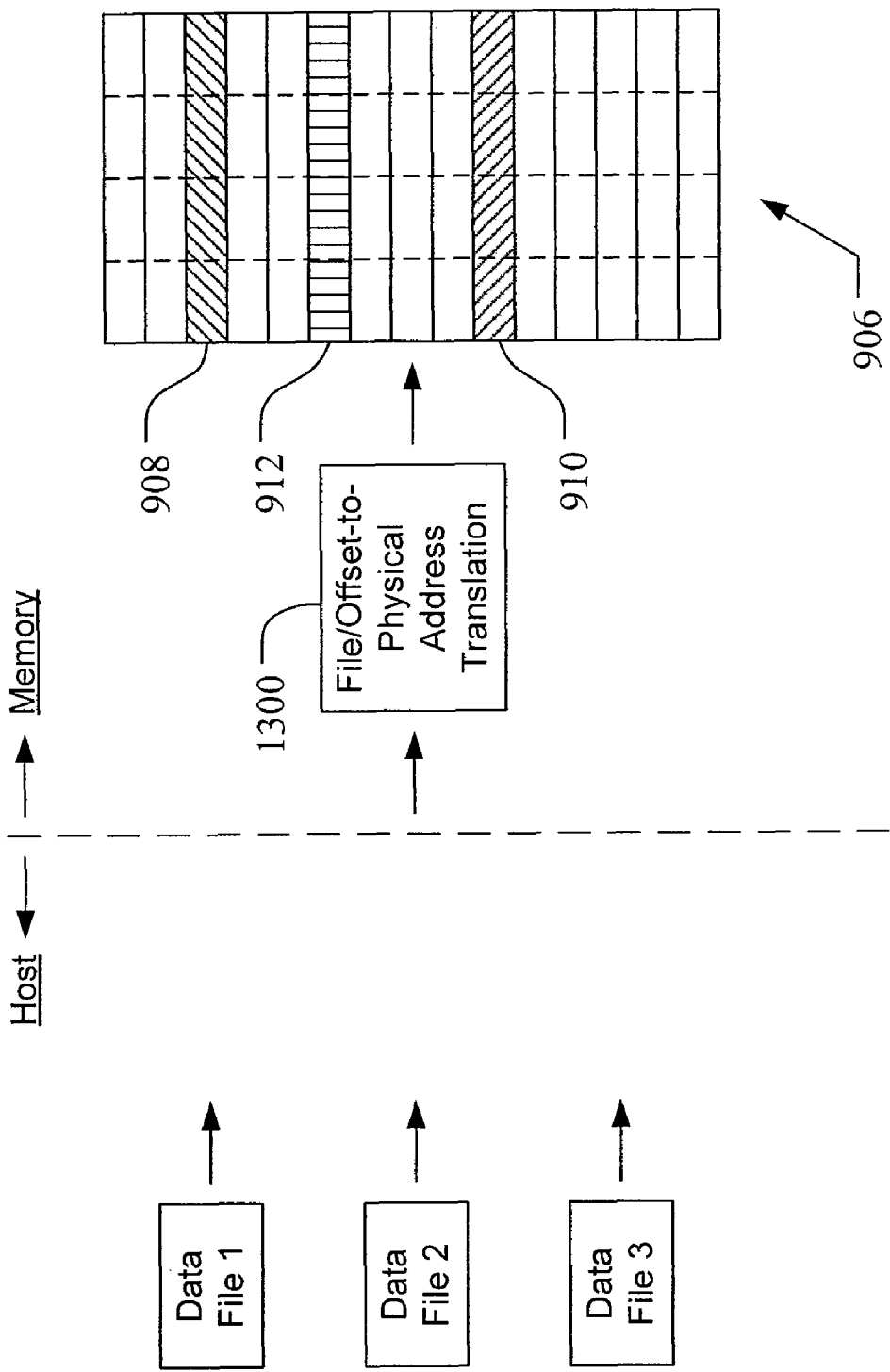
FIG. 13 illustrates a direct data file storage interface between a host and a re-programmable memory system.

A DFS file interface is illustrated in FIG. 13, which may be compared with the logical address interface of FIG. 9. An identification of each of the Files 1, 2 and 3 and offsets of data within the files of FIG. 13 are passed directly from the host to the memory controller. This file address information is then translated by a memory controller function 1300 into physical addresses of metablocks and metapages of the memory 906. A file directory keeps track of the host file to which each stored sector or other unit of data belongs.

Figure 14:
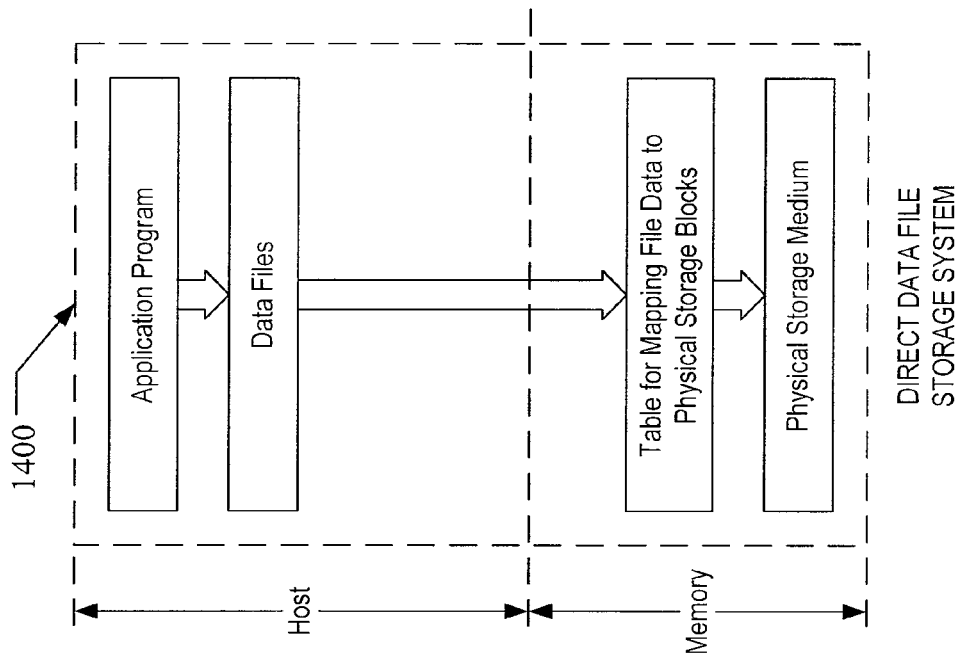
FIG. 14 illustrates, in a different manner than FIG. 13, a direct data file storage interface between a host and a re-programmable memory system.

The direct data file interface 1400 is also illustrated by FIG. 14, which should be compared with the logical address interface 1000 of FIG. 10. The logical address space and host-maintained FAT table of FIG. 10 are not present in FIG. 14. Rather, data files generated by the host are identified to the memory system by file number and offsets of data within the file. The memory system controller then directly maps the files to the physical blocks of the memory cell array and maintains directory and index table information of the memory blocks into which host files are stored. It is then unnecessary for the host to maintain the file allocation table (FAT) that is currently necessary for managing a logical address interface.

Because the memory system knows the locations of data making up each file, this data may be erased soon after a host deletes the file. This is not possible with a typical logical address interface. Further, by identifying host data by file objects instead of using logical addresses, the memory system controller can store the data in a manner that reduces the need for frequent data consolidation and collection. The frequency of data copy operations and the amount of data copied are thus significantly reduced, thereby increasing the data programming and reading performance of the memory system. Details on direct data file storage memory systems are described in the following applications: U.S. Patent Publication No. 2006-0184720 A1, entitled "Direct Data File Storage in Flash Memories"; U.S. Patent Publication No. 2006-0184718 A1, entitled "Direct File Data Programming and Deletion in Flash Memories"; U.S. Patent Publication No. 2006-0184719 A1, entitled "Direct Data File Storage Implementation Techniques in Flash Memories"; U.S. Patent Publication No. 2007-0033323 A1, entitled "Interfacing Systems Operating Through a Logical Address Space and on a Direct Data File Basis"; U.S. Patent Publication No. 2007-0136555 A1, entitled "Logically-Addressed File Storage Methods"; and U.S. application Ser. No. 11/616,242, filed Dec. 26, 2006, entitled "Use of a Direct Data File System with a Continuous Logical Address Space Interface. These applications, collectively referred to herein as the "Direct Data File Storage Applications", are hereby incorporated by reference in their entirety for all purposes.

The direct data file interface of these Direct Data File Storage Applications, as illustrated by FIGS. 13 and 14, is simpler than the logical address space interface described above, as illustrated by FIGS. 9 and 10, and allows for improved memory system performance. Although the direct data file storage may be preferred for many applications, host systems are primarily configured at the present time to operate with the logical address space interface. Thus, a memory system with a direct data file interface may not be compatible with most hosts. Because memory systems may be configured to use a DFS memory management format with the ability to operate with a legacy LBA interface, or may simply be able to take advantage of additional information from a host to optimize organization of stored data, a host operating system is disclosed herein that can operate with legacy memory systems as well as memory systems that can take advantage of information relating to the data type or host file information that can be provided in advance LBA to DFS Interface Adapter In order to take advantage of the additional file tagging or data type tagging information that a host may provide, a memory system may be used with the disclosed host file system where the memory system can utilize DFS memory management format in situations where the host operates in a logical address space. One suitable memory system may receive data associated with addresses in a logical block address (LBA) format from the host and assemble a group of data within the received data from the host system based on a correlation of the group of data to an application file on the host system. The memory system would then map the LBA addresses for the group of data to offset addresses within a data object generated by the memory system. Using this data object, which is identified by a unique file name, the memory system would then directly translate the group of data identified by the unique file name into physical addresses of blocks of memory cells.

Figure 15:
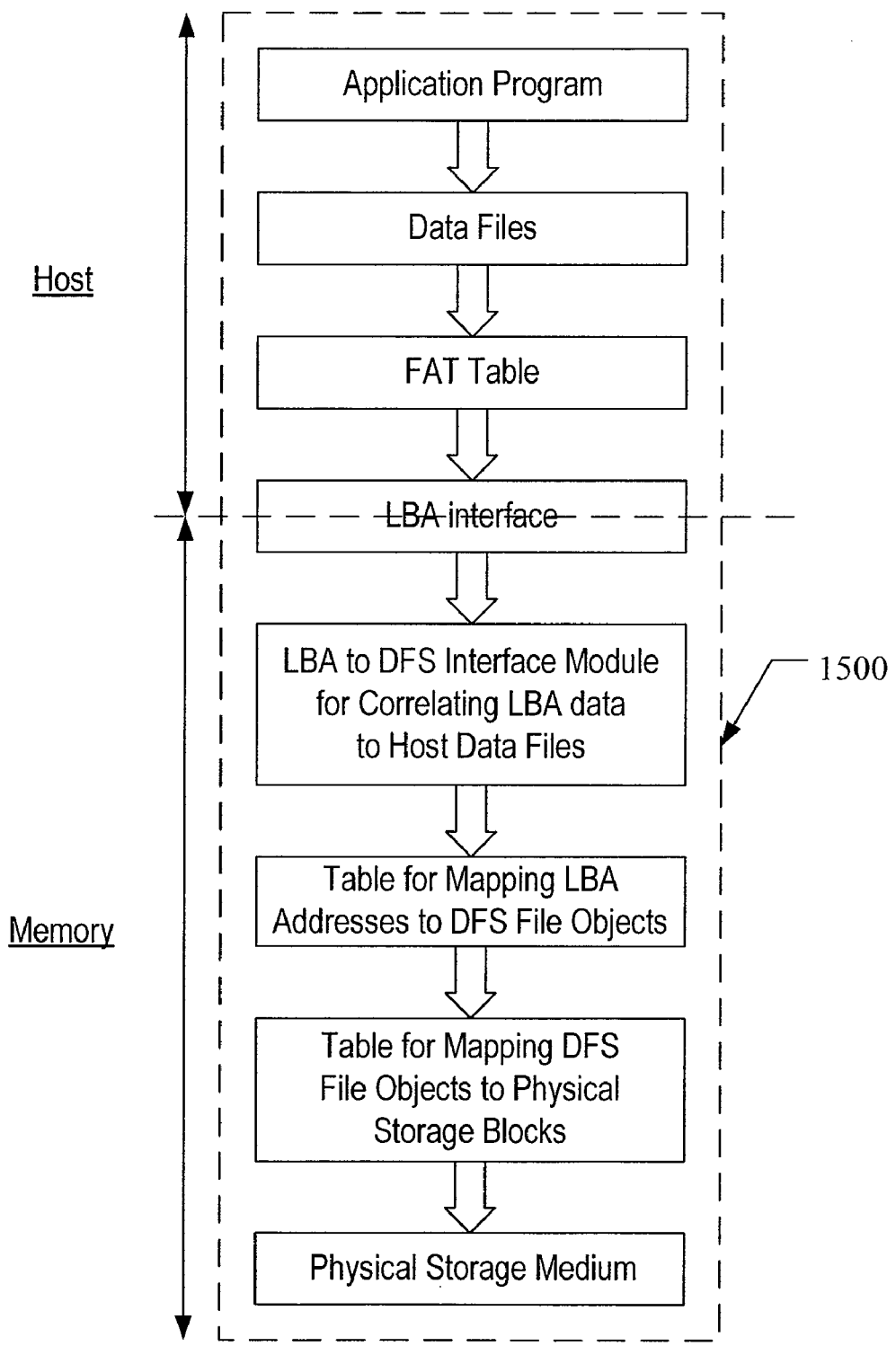
FIG. 15 illustrates a logical block address (LBA) to direct data file storage (DFS) interface adapter in a memory system in communication with a host.

Referring to the LBA-to-DFS memory system 1500 of FIG. 15, several of the differences between the LBA (FIG. 10), DFS (FIG. 14) and LBA-to-DFS memory systems can be seen. Unlike the logical address space of the LBA storage format, the LBA-to-DFS storage format shown in FIG. 15 maps logical addresses supported by the host into data files manageable by the memory and then stores tables both for relating LBA addresses to file objects and for relating file objects to physical storage blocks. Unlike the host-controlled DFS storage format, the LBA-to-DFS storage format is compatible with hosts that use logical address space and maintain FAT table data.

Figure 16:
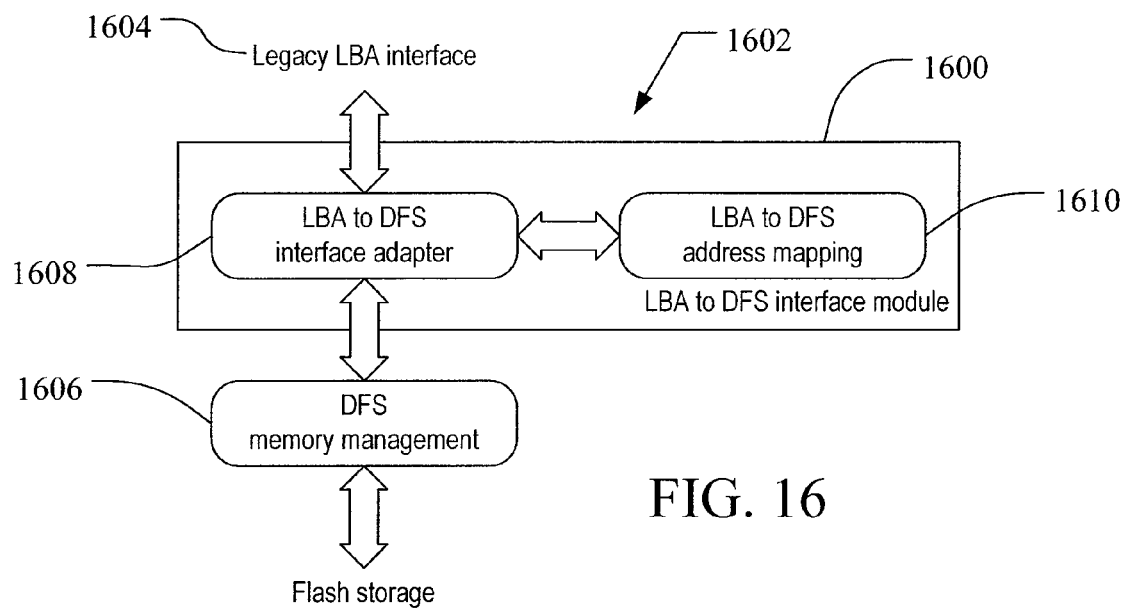
FIG. 16 is a block diagram of an LBA to DFS interface module suitable for utilizing the file tagging and/or data type tagging information provide by a host via an LBA interface

As shown in FIG. 16, in order to accomplish this interface between the logical address space of the host and the direct file storage format of the flash memory, an LBA to DFS interface module 1600 in the memory system 1602 may be provided that permits for the translation between formats and for improved correlation between host-generated file data and the associated data in the memory. The LBA to DFS interface module 1600 is positioned to communicate with a legacy LBA interface 1604 and a DFS memory management module 1606. The DFS memory management module 1606 manages the translation of file objects to physical space in flash storage in the manner described for DFS above. The LBA to DFS interface module 1600 may be implemented as processor executable firmware or software in the controller 300 of the memory system 102, 202 of FIGS. 1-2.

When the interface module 1600 receives data from a host via the legacy LBA interface 1604, the data has been allocated LBA addresses within an address space for the memory system by a file system resident in the host and, as noted previously, the addresses for data received may be fragmented within the LBA address space. The function of the LBA to DFS interface adapter 1608 is to create groups of data from within the data received at the LBA interface 1604, each of which is treated as a unique file object by the DFS memory management module 1606.

The LBA to DFS address mapping module 1610 records the relationship between every LBA address in the device that has been allocated to store data for a file and its corresponding address in DFS format. Using this relationship information, it performs translation between LBA and DFS address formats. LBA to DFS address mapping guarantees that the correct data for any LBA address can be accessed, whatever the degree of correlation that may exist between a file object created by the LBA to DFS interface adapter 1608 and an application file in the host.

An address run of contiguous LBA addresses that is allocated to valid data is mapped by the address mapping module 1610 to a run of contiguous offset addresses for a DFS file object. An entry for each address run is stored in an LBA address table, and comprises the following fields:

1. Start LBA
2. Length of run in sectors
3. DFS fileID
4. Start DFS offset address A lookup operation for a target LBA is performed on the LBA address table as follows:

a) The entry with the lowest value in its "start LBA" field that is > or =target LBA is found
b) The previous entry is selected as the entry defining the target LBA run
c) The run offset of the target LBA within the target LBA run is identified as the target LBA minus the value in the "start LBA" field
d) If run offset>the value in the "length of run in sectors", then the target LBA does not exist in the device and the lookup operation is complete
e) The target DFS fileID is read as the value in the "DFS fileID" field
f) The target DFS offset address is determined as the value in the "start DFS offset address" field plus run offset The DFS fileID is created by the DFS memory management module 1606 in response to a request by interface adapter 1608. The DFS fileID is recognized by the DFS back-end of the memory system 1602. The DFS file ID and the offset address are used by the DFS memory management module 1606 to map the file object to physical address locations, or memory blocks, in the flash memory. Entries in the LBA address table are stored in order of their start LBA value, and are not necessarily grouped together according to DFS fileID value.

The LBA address table does not relate the start offset address value for an address run relating to a specific DFS fileID to an offset in the corresponding application file in the host, either implicitly or explicitly. If the start LBA address value for data to be written to a DFS file with specified fileID already exists in the LBA address table and is already mapped to that fileID, the write operation is an update to existing data and the existing DFS offset address value is retained. If the start LBA address value for data to be written to a DFS file with specified fileID does not exist in the LBA address table, the write operation is an append operation and the highest existing DFS offset address for that fileID incremented by one is used. If the start LBA address value for data to be written to a DFS file with specified fileID already exists in the LBA address table but is already mapped to a different filed, the request is either treated as an error, or the write operation is treated as an append operation, depending on the scheme being used in the LBA to DFS interface adapter 1608.

When a file is deleted, all entries in the LBA address table relating to the DFS file with specified fileID are removed. The LBA address table is stored as a file by DFS memory management 1606. Read and write operations to this file may be in DFS offset address units of a sector.

In order to map the LBA addresses to DFS addresses, the LBA to DFS interface adapter 1608 must first create the file objects that are used to define the DFS addresses. Although the file objects created by the interface adapter 1608 preferably correlate with application files that are managed within the host system, file objects uncorrelated with the application files may also be generated. One or more different file object generating schemes can be incorporated in the LBA to DFS interface adapter 1608 for creation of file objects. The LBA to DFS interface adapter 1608 may be configured with the capability of executing more than one of the schemes or selecting between one or more such schemes. For instance, if the interface adapter 1608 is associated in a removable memory system that may be used with multiple hosts, the interface adapter 1608 may be configured with two or more of the schemes and may automatically select a particular scheme based on the type or arrangement of the host it is connected to. The selection may be a permanent selection based on the first host that the memory system is connected with, or the selection may take place each time a different host is connected with the memory system. In yet other implementations, the interface adapter may select a scheme on a file-by-file basis rather than making a one-time scheme selection when the removable memory system is first connected with a particular host. Alternatively, the memory system may be configured with only one of these schemes. For example, if the memory system is fabricated for use with a single host, as is the case for a solid state disk for a laptop computer, then a single one of the schemes discussed below may be implemented.

As used in the discussion herein, the term "file" is defined as a grouping of application data that is managed as a named entity within the host file system. Data may be deleted in units of complete files. The term "metadata" is defined herein as any grouping of data created within the host file system. Examples of metadata may include data for a root directory, file allocation table (FAT) directory, FAT entries, or the equivalent in the NTFS file system, such as $bitmap files and $MFT files. In the NTFS file system, files of metadata, also referred to as a "metafile", store groups of metadata. Metafiles may be separately defined for cases where there is set of data within which part of the data is regularly updated or for a set of data that may be independently deleted. A limited number of metafiles may exist.

One type of file object generating scheme is noted below that takes advantage of information on host data files (e.g., the file tagging and/or data type tagging information generated by the host 800) available prior to a data write operation. In this scheme, file objects are created based on file tagging information that is passed from the host at the LBA interface before related data is written. This information allows all data to be associated with a specific file or a specific file metadata. It should be noted that various file object generation schemes may be implemented in the LBA to DFS interface module 1600 as firmware or as processor executable software routines.

DFS Commands Used By LBA to DFS Interface Module

Regardless of the specific approach used by the interface module 1600 for generating a file object, once the interface module determines a DFS fileID relevant to a read or write operation, or recognizes the need to create a fileID, the interface module communicates with the DFS memory management module 1606 using a subset of the DFS commands. These commands may be generated within the LBA to DFS interface module 1600 and passed to DFS memory management 1606. The following DFS file commands are used by the interface module 1600 to create a file object or instruct the DFS memory management 1606 regarding activity relating to an existing file object.

$DFS_create<type>: The $DFS_create command causes a new file to be created in DFS memory management 1606. An available fileID value is assigned to the file by DFS memory management 1606, and is returned to the LBA to DFS interface module for use in subsequently identifying the file. A directory entry for the file is also created within DFS memory management 1606, and the file is opened.

The <type> parameter is optional. If omitted, the file is treated as a standard DFS file. If <type> specifies a metafile received from the host, or a file storing management information for the LBA to DFS interface module, the DFS memory management 1606 adopts the appropriate management strategy for this type of file. Special management strategies for a specific file can include avoiding sharing flash memory blocks with data for any other file, and using a specific type of flash block, such as binary (SLC) or MLC, for data for the file.

$DFS_open<fileID>: This $DFS_open command enables execution of subsequent data commands for the file specified by <fileID>. The write_pointer for the file is set to the end of the file, and the read_pointer for the file is set to the beginning of the file. If the specified value for <fileID> does not exist, or a specified maximum number of files that can be concurrently open is exceeded, the command is not executed and an error message is returned.

$DFS_close<fileID>: The $DFS_close command disables execution of subsequent data commands for the specified file. Write_pointer and read_pointer values for the file become invalid.

$DFS_delete<fileID>: The $DFS_delete command indicates that directory, file index table and attributes entries for the file specified by <fileID> should be deleted. Data for the files may be erased. The deleted file may not be subsequently accessed.

In addition to the file commands, the interface module 1600 may use a number of DFS data commands to initiate data input and output operations for a specified file, and to define offset address values within the file. The specified file must have been opened by the host. If this is not the case, an error is returned. As discussed in the file commands above, <fileID> is the file handle that was assigned by DFS memory management module 1606 when the file was created. The DFS data commands are as follows:

$DFS_write<fileID> <length>: Data to be supplied to the device following receipt of the $DFS_write command will be written in the specified file at the offset address defined by the current value of the write_pointer. The $DFS_write command is used to write new data for a file, append data to a file, and update data within a file. <length> is an optional parameter defining the length of data to be written. A $DFS_write command not specifying length may be superseded, after some associated data has been written, by another $DFS_write command for the same fileID specifying the length of data remaining to be written. DFS memory management 1606 issues one or more instructions for writing a data burst in response to a $DFS_write command.

$DFS_read<fileID>: Data in the specified file at the offset address defined by the current value of the read_pointer may be read from the device following receipt of the $DFS_read command. DFS memory management 1606 issues one or more instructions for reading a data burst in response to a $DFS_read command.

$DFS_delete_data <fileID> <offset> <length>: Indicates that data of specified length for the specified file and offset address should be deleted. The data may be erased.

$DFS_write_pointer<fileID> <offset>: The $DFS_write_pointer command sets the write_pointer for the specified file to the specified offset address. The write_pointer is incremented by the device following a data burst instruction in response to a $DFS_write command.

$DFS_read_pointer<fileID> <offset>: The $DFS_read_pointer command sets the read_pointer for the specified file to the specified offset address. The read_pointer is incremented by the device following a data burst instruction in response to a $DFS_read command.

The LBA to DFS interface module 1600 may also issue a DFS state command: The $DFS_idle command indicates that the LBA to DFS interface module is entering an idle state, during which DFS memory management 1606 may perform internal operations. The idle state may be ended by transmission of any other command to DFS memory management 1606, whether or not it is busy with an internal operation. Upon receipt of such other command, any internal operation in progress in the DFS memory management 1606 must be suspended or terminated within a specified time.

The following DFS device commands allow the LBA to DFS interface module to interrogate the DFS memory management module 1606:

$DFS_capacity: In response to the $DFS_capacity command, DFS memory management module 1606 reports the capacity of file data stored in the device, and the capacity available for new file data.

$DFS_file: In response to the $DFS_file command, DFS memory management 1606 reports information about the specified file, including size.

$DFS_status: In response to the $DFS_status command, DFS memory management 1606 reports its current status. The status command does not terminate a command being executed. Status includes two types of busy status. DFS memory management 1606 is busy performing a foreground operation for writing or reading data. DFS memory management 1606 is busy performing a background operation initiated whilst the LBA to DFS interface module was in the idle state.

When receiving the file tagging and/or data type tagging information from the host, a memory system having the LBA-to-DFS capability discussed above will create a table mapping the ID used by the host to the DFS file ID used by the memory system for every open file in the memory system. Each entry in the ID table contains the ID value and fileID of the file. An entry is added to the table for each $create or $open command, and an entry is deleted from the table for each $close or $delete command. Although the ID table may be stored in non-volatile or volatile memory, in one implementation the ID table is stored in volatile memory, such as RAM 320 in controller 300 of FIG. 3, as all ID values are meant to be invalid if power is removed from the memory device. The DFS fileID value is used for all subsequent $DFS_write commands passed by the interface adapter 1608 to DFS memory management 1606, until re-specified by another file tagging command. In other implementations, if the host is configured to maintain ID information such that an application file will always receive the same ID regardless whether that application file is currently open or power is cycled, the ID table may be maintained in non-volatile memory in the memory system 102, 202, 802.

Each of the file tagging commands causes the LBA to DFS interface module to take one or more steps to assist the memory manager in maintaining the efficient file object storage format of DFS. For example, in advance of writing to on an open file, the host will send a $file command. In response, the interface module 1600 reads the ID table to determine the DFS fileID to which the ID value received with the $file command relates. This fileID value is used for all subsequent $DFS_write commands passed to DFS memory management 1606, until re-specified by another file tagging command.

Other examples of operations that may be performed by the LBA to DFS interface module, using the file tagging scheme outlined above, are discussed below. Upon receipt from the host of a $create command identifying that the host is opening a new file, the interface adapter 1608 generates a separate $DFS_create command and passes this command to DFS memory management 1606. DFS memory management 1606 responds with a DFS fileID value. An entry is added by the interface adapter 1608 to an ID table, recording ID and fileID values.

Upon receipt of a $open command from a host, the LBA address table is read to determine the DFS fileID to which data at LBA address IA has been mapped. An entry is added to the ID table, recording ID and fileID values, and a $DFS_open command for the relevant fileID is passed by the interface adapter 1608 to DFS memory management 1606. This fileID value is used for all subsequent $DFS_write commands passed to DFS memory management 1606, until re-specified by another file tagging command.

The interface adapter 1608, in response to receipt of a $close command, may read the ID table to determine the DFS fileID to which the ID value received with the $close command relates. A $DFS_close command for the relevant fileID is passed to DFS memory management 1606. The entry for the ID value is removed from the ID table.

Following a $delete command, the ID table is read to determine the DFS fileID to which the ID value received with the $delete command relates. A $DFS_file command is passed from the interface adapter 1608 to DFS memory management 1606 to determine the size of the file that has been deleted. A $DFS_delete command for the relevant fileID is then passed by the interface adapter 1608 to DFS memory management 1606. The interface adapter 1608 removes the entry for the ID value from the ID table. Additionally, entries for LBA runs previously allocated to the deleted file are removed from the LBA address table.

In response to a $free command from the host, the LBA address table is read to identify DFS address runs mapped to LBA address runs that have been de-allocated by the $free command. A $DFS_delete_data command is passed from the interface adapter 1608 to DFS memory management 1606 for each DFS run thus identified. Also, entries are modified or removed from the LBA address table for each LBA run identified.

In other implementations, it is contemplated that a memory system 102, 202, 802 configured with a LBA to DFS interface adapter 1608 may also include a set of instructions to pass to a host to enable the host to provide file tagging instructions such as described above. In this implementation, the memory system 102, 202, 802 may initially attempt to upload the instruction set for generating file tagging commands to the host. This upload may be triggered upon memory system initialization, for example when the memory system receives power, and may include processor executable instructions for generating file tagging commands to send to the memory system. The upload of the instructions to the host may be automatic on power-up, may follow an unanswered handshaking query such as the $identify command discussed above, or may be triggered by other combinations of operations.

Although higher correlation of file objects to the host application files is preferable in order to optimize the benefits of improved memory system performance from a DFS memory management system, correlation does not affect memory system functionality. An absolute mapping between LBA address runs and offset addresses within DFS files is rigorously maintained in the LBA to DFS address mapping module 1610 regardless of the approach used to create file objects. However, the closer the correlation that can be achieved, the greater is the efficiency of the data storage management by DFS. When fully definitive directory and FAT information for a host file has been written, a comparison can be made between the allocation of LBA addresses to that host file and the allocation of the same addresses to the file object in which the data has been stored. The interface module 1600 may include the ability to request of the memory management 1606 that files be split or merged, based on their correlation with host files. The DFS back-end will only accept a request if the operation can be performed substantially without relocating file data, by modifying the file index table records in DFS.

Separate file objects, represented by respective DFS fileIDs, may be associated with each other by means of a $DFS_associate command generated by the LBA to DFS interface adapter 1608. Files for which an association has been formed are referred to as an associated set. A purpose of file association is to restrict the number of blocks containing data for files in the associated set together with data for files not in the associated set. When the interface adapter 1608 uses the $DFS_associate command, the associated file objects should be deleted as a set when the external host file is deleted. Block fragmentation for the associated set may be controlled using a scheme similar to that used for a single DFS file as described in the Direct Data File Storage Applications using of a variant of the allocation algorithm for the block to which data for a file is to be written (the active block for the file).

An associated set of files may created by a single $DFS_associate command. All DFS fileIDs in the associated set should be specified as parameters for the command. If any file in the set was previously associated with one or more other files not currently specified in the set, the association status of these other files is cancelled. All files specified by a $DFS_associate command to be in an associated set must not have data in blocks that are shared with any other file. Any file specified by a $DFS_associate command that has data in any shared block is not included in the set and is not designated as an associated file.

A file is designated as being part of an associated set by fields in the File Index Table record, a table maintained in the DFS memory management 1606 of data groups associated with a host file, for the file. If an active block for a non-associated file selected for allocation contains data for any file that is an associated file, another block is selected in its place. An active block to be allocated for an associated file should be restricted to partial blocks containing data for one or more files with which the file is associated. If no partial block exists within this restriction, all file associations are removed between files in the associated set, and any partial block is selected.

The description above is directed to the example of a host system with a logical address space interface and a flash memory system with a file based memory management system communicating with each other. An LBA to DFS interface adapter 1608, such as described above, integrated into an SSD 202 with DFS capabilities may provide advantages in durability of the flash memory media regardless of whether the laptop 200 or other host includes an operating system configured for taking full advantage of the DFS capabilities. Also, the techniques described herein may work with a wide variety of data storage systems in addition to flash memory, such as magnetic disk drives, optical disk drives, dynamic read-only-memory (DRAM), static read-only-memory (SRAM), read-only memory (ROM), semiconductor magnetic memory, and the like. In addition, other memory management schemes, aside from LBA-to-DFS enabled memory systems, may utilize the file tagging and/or data type tagging information generated by the host From the foregoing, a method and apparatus for providing file tagging and/or data type tagging information to a memory system is disclosed. The host may be configured to work with legacy LBA interface memory devices and selectively provide additional host file related information to a memory system that is able to accept and use such information. The additional information may be data type tagging information that is passed on to the memory device exclusive of any other type of information other than the LBA address information and the data to be stored. The additional information may alternatively be host file information that is sent without data type information. A combination of data type tagging and file tagging information is also contemplated. It is therefore intended that the foregoing detailed description be regarded as illustrative rather than limiting, and that it be understood that it is the following claims, including all equivalents, that are intended to define the spirit and scope of this invention.

The invention claimed is:

1. A method of transferring data between a host system and a re-programmable non-volatile mass storage system, the method comprising:
    identifying a data type of data to be transmitted next to the mass storage system;
    transmitting data type information to the mass storage system regarding the data type of the data to be transmitted next to the mass storage system, without providing identification of a particular host file to which the data type information pertains, wherein the data type comprises a first data type; and
    after transmitting the data type information, transmitting logical block address (LBA) information associated with the data to be transmitted next, and transmitting the data to be transmitted next, to the mass storage system.

2. The method of claim 1, further comprising transmitting additional data having the first data type to the mass storage system after the data to be transmitted next, and logical block address (LBA) information associated with the additional data, without transmitting additional data type information, if no data having a data type different than the first data type is transmitted prior to the additional data.

3. The method of claim 2, wherein the additional data relates to a different host file than the data to be transmitted next.

4. The method of claim 1, further comprising transmitting data type information identifying a second data type after transmitting the data to be transmitted next; and
    transmitting data having the second data type after transmitting the data type information identifying the second data type.

5. The method of claim 1, wherein the first data type comprises one of the group consisting of temporary file data, metadata, file extension and file size.

6. A non-transitory computer readable medium comprising processor executable instructions for providing advance data type information to a mass storage system, the instructions configured to cause a processor to:
    identify a data type of data to be stored in the mass storage system;
    transmit data type information to the mass storage system regarding the data type of data to be transmitted next to the mass storage system, without providing identification of a particular host file to which the data type information pertains, wherein the data type comprises a first data type; and
    after transmitting the data type information, transmit data having the first data type, and logical block address (LBA) information associated with the data having the first data type, to the mass storage system.

7. The computer readable medium of claim 6, further comprising instructions for transmitting additional data having the first data type to the mass storage system, and logical block address (LBA) information associated with the additional data having the first data type, without transmitting additional data type information, if no data having a data type different than the first data type is transmitted prior to the additional data.

8. The computer readable medium of claim 7, wherein the additional data relates to a different host file than the data having the first data type.

9. The computer readable medium of claim 6, further comprising instructions for transmitting data type information identifying a second data type after transmitting the data having the first data type and prior to transmitting data having the second data type.

10. The computer readable medium of claim 6, wherein the first data type comprises one of the group consisting of temporary file data, metadata, file extension and file size.

11. A host system comprising:
    a processor;
    a mass storage system interface in communication with the processor, the mass storage system interface configured to transmit data to or receive data from a mass storage system; and
    a host file system operative on the processor and configured to:
    identify a data type of data to be stored in the mass storage system;
    transmit data type information regarding the data type of data to be transmitted next to the mass storage system without providing identification of a particular host file to which the data type information pertains, wherein the data type comprises a first data type; and
    after transmitting the data type information, transmit data having the first data type, and logical block address (LBA) information associated with the data having the first data type, to the mass storage system.

12. The system of claim 11, wherein the host file system is further operative to transmit additional data having the first data type to the mass storage system after the data to be transmitted next, and logical block address (LBA) information associated with the additional data having the first data type, without transmitting additional data type information, if no data having a data type different than the first data type is transmitted prior to the additional data.

13. The system of claim 12, wherein the additional data relates to a different host file than the data to be transmitted next.

14. The system of claim 11, wherein the host file system is further operative to transmit data type information identifying a second data type after transmitting the data having the first data type and prior to transmitting data having the second data type.

15. The system of claim 11, wherein the first data type comprises one of the group consisting of temporary file data, metadata, file extension and file size.

16. A method of transferring data between a host system and a re-programmable non-volatile mass storage system, the method comprising:
    identifying a data type associated with data to be transmitted next to the mass storage system;
    associating the data type with the data to be transmitted next;
    transmitting information corresponding to the data type for the data to be transmitted next;
    subsequent to transmitting information corresponding to the data type, transmitting logical block address (LBA) information associated with the data to be transmitted next, and transmitting the data to be transmitted next, to the mass storage system.

\* \* \* \* \*